US012780029B2

(12) United States Patent
Hashimoto et al.

(10) Patent No.: US 12,780,029 B2
(45) Date of Patent: Nov. 3, 2026

(54) WIRELESS POWER TRANSFER SYSTEM

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Shogo Tsuge, Fuji (JP); Ryosuke Ikemura, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 417 days.

(21) Appl. No.: 18/390,995

(22) Filed: Dec. 20, 2023

(65) Prior Publication Data

US 2024/0253503 A1 Aug. 1, 2024

(30) Foreign Application Priority Data

Jan. 31, 2023 (JP) ................................ 2023-013397

(51) Int. Cl.
*B60L 53/39* (2019.01)
*B60L 53/12* (2019.01)
*B60L 53/30* (2019.01)

(52) U.S. Cl.
CPC ............... *B60L 53/39* (2019.02); *B60L 53/12* (2019.02); *B60L 53/32* (2019.02)

(58) Field of Classification Search
CPC .......... H02J 50/80; B60L 53/32; B60L 53/12; B60L 53/39
See application file for complete search history.

(56) References Cited

U.S. PATENT DOCUMENTS

| | | | | |
|---|---|---|---|---|
| 10,399,446 | B2 * | 9/2019 | Tsukamoto | B60L 53/122 |
| 11,685,283 | B2 * | 6/2023 | Lu | B60L 53/63 320/109 |
| 11,731,522 | B2 * | 8/2023 | Sakakibara | B60L 53/126 370/242 |
| 11,738,650 | B2 * | 8/2023 | Hashimoto | H02J 50/80 307/104 |
| 12,027,889 | B2 * | 7/2024 | Hashimoto | B60L 53/68 |
| 12,115,867 | B2 * | 10/2024 | Zethraeus | B60L 5/39 |
| 12,145,464 | B2 * | 11/2024 | Hashimoto | H02J 50/402 |
| 12,214,692 | B2 * | 2/2025 | Hashimoto | H02J 50/60 |
| 12,237,694 | B2 * | 2/2025 | Ikemura | H02J 50/12 |

(Continued)

FOREIGN PATENT DOCUMENTS

| | | | | |
|---|---|---|---|---|
| CN | 112994264 A * | 6/2021 | | H02J 50/12 |
| JP | 2015-116084 A | 6/2015 | | |

(Continued)

OTHER PUBLICATIONS

JP_2019127113_A Fit machine translation (Year: 2026).*

*Primary Examiner* — S. Joseph Morano
*Assistant Examiner* — Maxwell L Meshaka
(74) *Attorney, Agent, or Firm* — Sughrue Mion, PLLC

(57) ABSTRACT

A wireless power transfer system transfers power from a supply device on a road to a vehicle using contactless power transfer. Further, the vehicle includes: a plurality of power reception devices that receive power from the supply device; and a processor, and the processor: determines power to be received by each of the plurality of power reception devices; and transmits power information related to the power of each of the plurality of power reception devices to the supply device.

4 Claims, 10 Drawing Sheets

(56) References Cited

U.S. PATENT DOCUMENTS

| | | | | |
|---|---|---|---|---|
| 12,291,113 | B2 * | 5/2025 | Hirano | B60L 53/14 |
| 12,308,669 | B2 * | 5/2025 | Hashimoto | B60L 53/124 |
| 12,337,714 | B2 * | 6/2025 | Lu | B60L 53/63 |
| 12,355,273 | B2 * | 7/2025 | Ikemura | H02J 50/12 |
| 12,397,669 | B2 * | 8/2025 | Hashimoto | B60L 53/32 |
| 12,427,875 | B2 * | 9/2025 | Maemura | B60L 53/122 |
| 12,434,580 | B2 * | 10/2025 | Hashimoto | B60L 53/122 |
| 12,454,192 | B2 * | 10/2025 | Yokoyama | B60L 53/35 |
| 12,456,933 | B2 * | 10/2025 | Ikemura | B60L 53/32 |
| 12,479,322 | B2 * | 11/2025 | Hashimoto | B60L 53/60 |
| 12,503,039 | B2 * | 12/2025 | Seo | B60Q 1/12 |
| 12,539,778 | B2 * | 2/2026 | Fujimoto | B60L 53/126 |
| 12,583,438 | B2 * | 3/2026 | Hashimoto | B60W 10/06 |
| 2016/0126778 | A1 | 5/2016 | Kanahara et al. | |
| 2016/0297305 | A1 | 10/2016 | Ichikawa | |
| 2017/0063161 | A1 * | 3/2017 | Sugiyama | H02J 50/12 |
| 2017/0113557 | A1 * | 4/2017 | Tsukamoto | B60L 53/122 |
| 2018/0278081 | A1 | 9/2018 | Kanahara et al. | |
| 2019/0305610 | A1 * | 10/2019 | Oyama | H04B 5/79 |
| 2021/0291691 | A1 * | 9/2021 | Lu | B60L 53/68 |
| 2021/0306209 | A1 * | 9/2021 | Sakakibara | B60L 53/126 |
| 2021/0391759 | A1 * | 12/2021 | Mori | B60L 53/12 |
| 2022/0252678 | A1 * | 8/2022 | Hashimoto | G01C 21/3415 |
| 2022/0297544 | A1 * | 9/2022 | Zethraeus | B60L 5/39 |
| 2022/0363147 | A1 * | 11/2022 | Hashimoto | B60L 53/122 |
| 2022/0363148 | A1 * | 11/2022 | Hashimoto | B60L 53/126 |
| 2022/0368174 | A1 * | 11/2022 | Hashimoto | B60L 53/68 |
| 2022/0402386 | A1 | 12/2022 | Ikemura et al. | |
| 2023/0012118 | A1 * | 1/2023 | Hashimoto | B60L 53/12 |
| 2023/0016466 | A1 * | 1/2023 | Berggren | B60L 53/12 |
| 2023/0039132 | A1 * | 2/2023 | Hashimoto | B60L 53/665 |
| 2023/0055398 | A1 * | 2/2023 | Hirano | B60L 53/305 |
| 2023/0057789 | A1 * | 2/2023 | Hirano | B60L 53/39 |
| 2023/0088378 | A1 * | 3/2023 | Fujimoto | B60L 53/126<br>191/10 |
| 2023/0107122 | A1 * | 4/2023 | Yokoyama | B60L 53/35<br>320/104 |
| 2023/0322114 | A1 * | 10/2023 | Lu | B60L 55/00<br>320/109 |
| 2023/0327499 | A1 * | 10/2023 | Ikemura | H02J 50/90 |
| 2023/0336095 | A1 * | 10/2023 | Ikemura | B60L 53/67 |
| 2024/0106275 | A1 * | 3/2024 | Ikemura | H02J 50/12 |
| 2024/0113565 | A1 * | 4/2024 | Ikemura | H02J 50/12 |
| 2024/0253480 | A1 * | 8/2024 | Hashimoto | B60L 53/122 |
| 2024/0253481 | A1 * | 8/2024 | Hashimoto | B60L 53/122 |
| 2024/0253482 | A1 * | 8/2024 | Hashimoto | B60L 53/122 |
| 2024/0253483 | A1 * | 8/2024 | Hashimoto | B60L 53/124 |
| 2024/0253484 | A1 * | 8/2024 | Hashimoto | B60L 53/126 |
| 2024/0253503 | A1 * | 8/2024 | Hashimoto | B60L 53/12 |
| 2024/0253504 | A1 * | 8/2024 | Maemura | B60L 53/39 |
| 2024/0253505 | A1 * | 8/2024 | Hashimoto | B60L 53/39 |
| 2024/0253506 | A1 * | 8/2024 | Hashimoto | B60L 53/60 |
| 2024/0258835 | A1 * | 8/2024 | Maemura | H02J 50/12 |
| 2024/0258841 | A1 * | 8/2024 | Hashimoto | B60L 53/124 |
| 2024/0270092 | A1 * | 8/2024 | Hashimoto | B60L 53/122 |
| 2024/0286500 | A1 * | 8/2024 | Hashimoto | B60L 53/122 |
| 2024/0286511 | A1 * | 8/2024 | Hashimoto | B60L 53/12 |
| 2024/0286512 | A1 * | 8/2024 | Hashimoto | B60L 53/62 |
| 2024/0286518 | A1 * | 8/2024 | Hashimoto | B60L 53/66 |
| 2024/0286520 | A1 * | 8/2024 | Hashimoto | B60L 53/68 |
| 2024/0294074 | A1 * | 9/2024 | Maemura | B60L 53/122 |
| 2024/0300355 | A1 * | 9/2024 | Hashimoto | B60L 53/39 |
| 2024/0308373 | A1 * | 9/2024 | Seo | G06V 20/58 |
| 2024/0308377 | A1 * | 9/2024 | Seo | B60L 53/36 |
| 2024/0308414 | A1 * | 9/2024 | Seo | B60Q 1/12 |
| 2024/0383357 | A1 * | 11/2024 | Hashimoto | B60L 53/12 |
| 2024/0399916 | A1 * | 12/2024 | Hashimoto | B60W 40/04 |
| 2024/0399922 | A1 * | 12/2024 | Hashimoto | B60L 55/00 |
| 2024/0409082 | A1 * | 12/2024 | Hashimoto | B60W 10/06 |
| 2024/0416784 | A1 * | 12/2024 | Hashimoto | H02J 50/12 |
| 2024/0424922 | A1 * | 12/2024 | Obayashi | B60M 7/00 |
| 2025/0100395 | A1 * | 3/2025 | Kimura | B60L 50/53 |
| 2025/0282245 | A1 * | 9/2025 | Lu | B60L 53/65 |

FOREIGN PATENT DOCUMENTS

| | | | | | |
|---|---|---|---|---|---|
| JP | 2016-092978 | A | | 5/2016 | |
| JP | 2019-127113 | A | | 8/2019 | |
| JP | 2021128571 | A | * | 9/2021 | |
| JP | 2021129432 | A | * | 9/2021 | |
| JP | 2023-000398 | A | | 1/2023 | |
| WO | 2022/020213 | A1 | | 1/2022 | |
| WO | WO-2022233671 | A1 | * | 11/2022 | B60L 53/32 |

* cited by examiner

WIRELESS POWER TRANSFER SYSTEM

CROSS-REFERENCE TO RELATED APPLICATION (S)

The present application claims priority to and incorporates by reference the entire contents of Japanese Patent Application No. 2023-013397 filed in Japan on Jan. 31, 2023.

BACKGROUND

The present disclosure relates to a wireless power transfer system.

Japanese Laid-open Patent Publication No. 2016-092978 describes a technology of a contactless charging system that includes: a vehicle equipped with a power reception device having a secondary coil; and a contactless charger including a primary coil and that performs contactless charging. In this technology, when the contactless charger receives a signal indicating an abnormality of the power reception device or when the contactless charger detects a charging abnormality, charging is temporarily stopped, and a procedure for resuming charging is performed after a lapse of predetermined time.

SUMMARY

There is a need for providing a wireless power transfer system capable of charging even with a plurality of power reception devices provided on the vehicle.

According to an embodiment, a wireless power transfer system transfers power from a supply device on a road to a vehicle using contactless power transfer. Further, the vehicle includes: a plurality of power reception devices that receive power from the supply device; and a processor, and the processor: determines power to be received by each of the plurality of power reception devices; and transmits power information related to the power of each of the plurality of power reception devices to the supply device.

DETAILED DESCRIPTION OF THE PREFERRED EMBODIMENTS

In the related art, Japanese Laid-open Patent Publication No. 2016-092978 only assumes a case where one power reception device is provided on the vehicle, and does not assume a case where a plurality of power reception devices is provided. Therefore, the technology has room for improvement.

The following specifically describes a wireless power transfer system in an embodiment of the present invention. Note that the present invention is not limited to the embodiment described below.

Configuration of Wireless Power Transfer System

Figure 1:
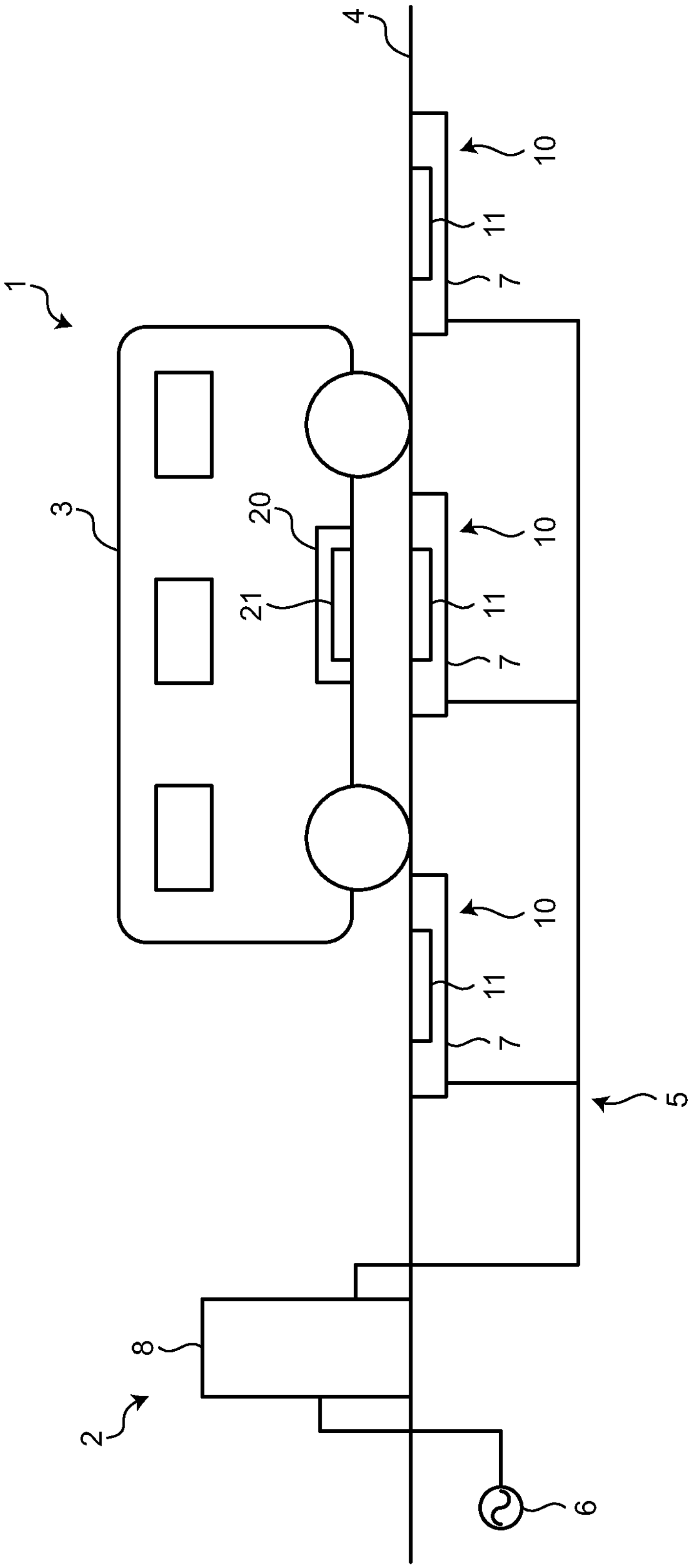
FIG. 1 is a schematic diagram illustrating a wireless power transfer system according to an embodiment.

FIG. 1 is a schematic diagram illustrating a wireless power transfer system in the embodiment. A wireless power transfer system 1 includes a supply facility 2 and a vehicle 3. The supply facility 2 is a facility that performs contactless power supply to the vehicle 3 being in motion. The vehicle 3 is an electric vehicle that can be charged with power supplied from an external power source, and is, for example, a large vehicle such as a bus or a truck as a Battery Electric Vehicle (BEV) or a Plug-in Hybrid Electric Vehicle (PHEV).

The wireless power transfer system 1 performs wireless power transfer from the supply facility 2 to the vehicle 3 by magnetic resonance coupling (magnetic resonance). The wireless power transfer system 1 uses contactless power transfer to transfer power from the supply facility 2 to the vehicle 3 being in motion on a road 4. That is, the wireless power transfer system 1 transfers power by a magnetic resonance method, and achieves in-motion power supply to the vehicle 3 using magnetic resonance coupling (magnetic resonance). The wireless power transfer system 1 can be described as a dynamic wireless power transfer (D-WPT) system or a magnetic field dynamic wireless power transfer (MF-D-WPT) system.

Configuration of Supply Device

The supply facility 2 includes: a supply device 5; and an AC power supply 6 that supplies power to the supply device 5. The supply device 5 uses contactless power transfer to transfer the power supplied from the AC power supply 6 to the vehicle 3. The AC power supply 6 is a commercial power source, for example. The supply device 5 includes a power transmission device 10 having a primary coil 11.

The supply device 5 includes a segment 7 including the primary coil 11 and a management device 8 that manages the segment 7. The segment 7 is embedded in a lane of the road 4. The management device 8 is installed beside the road 4. The segment 7 is electrically connected to the management device 8. The management device 8 is electrically connected to the AC power supply 6, and supplies the power from the AC power supply 6 to the segment 7. The segment 7 is electrically connected to the AC power supply 6 via the management device 8. The segment 7 can be disposed in plurality along the lane of the road 4. For example, as illustrated in FIG. 1, the supply device 5 includes: three segments 7 installed side by side along the lane in the road 4; and one management device 8 connected with the three segments 7. The segment 7 has a function of transferring power from the supply device 5 to the vehicle 3 using contactless power transfer. The management device 8 has a function of controlling wireless power transfer in the segment 7.

Configuration of Vehicle

The vehicle 3 includes a power reception device 20 having a secondary coil 21. The power reception device 20 is provided at the bottom of the vehicle body of the vehicle 3. When the vehicle 3 travels on the road 4 in which the primary coil 11 is installed, the primary coil 11 on the ground and the secondary coil 21 in the vehicle face each other in the vertical direction. The wireless power transfer system 1 transfers power from the primary coil 11 of the power transmission device 10 to the secondary coil 21 of the power reception device 20 using contactless power transfer while the vehicle 3 is in motion on the road 4.

In this description, the state of being in motion means a state in which the vehicle 3 is located on the road 4 for traveling. The state of being in motion includes a state in which the vehicle 3 is temporarily stopped on the road 4. For example, the state of being in motion includes a state in which the vehicle 3 is temporarily stopped on the road 4 due to waiting for a traffic light or the like. On the other hand, even when the vehicle 3 is located on the road 4, for example, the case where the vehicle 3 is completely stopped for parking is not included in the state of being in motion.

In addition, in this description, a lane in which the primary coil 11 (segment 7) is embedded may be referred to as a D-WPT lane, and a site being a partial section of the road 4 and capable of wireless power transfer by the supply device 5 may be referred to as a D-WPT charging site. In the D-WPT lane and the D-WPT charging site, a plurality of the primary coils 11 (a plurality of the segments 7) are installed in line in the traveling direction of the vehicle 3 over predetermined sections of the road 4.

Overall Configuration of Wireless Power Transfer System

Figure 2:
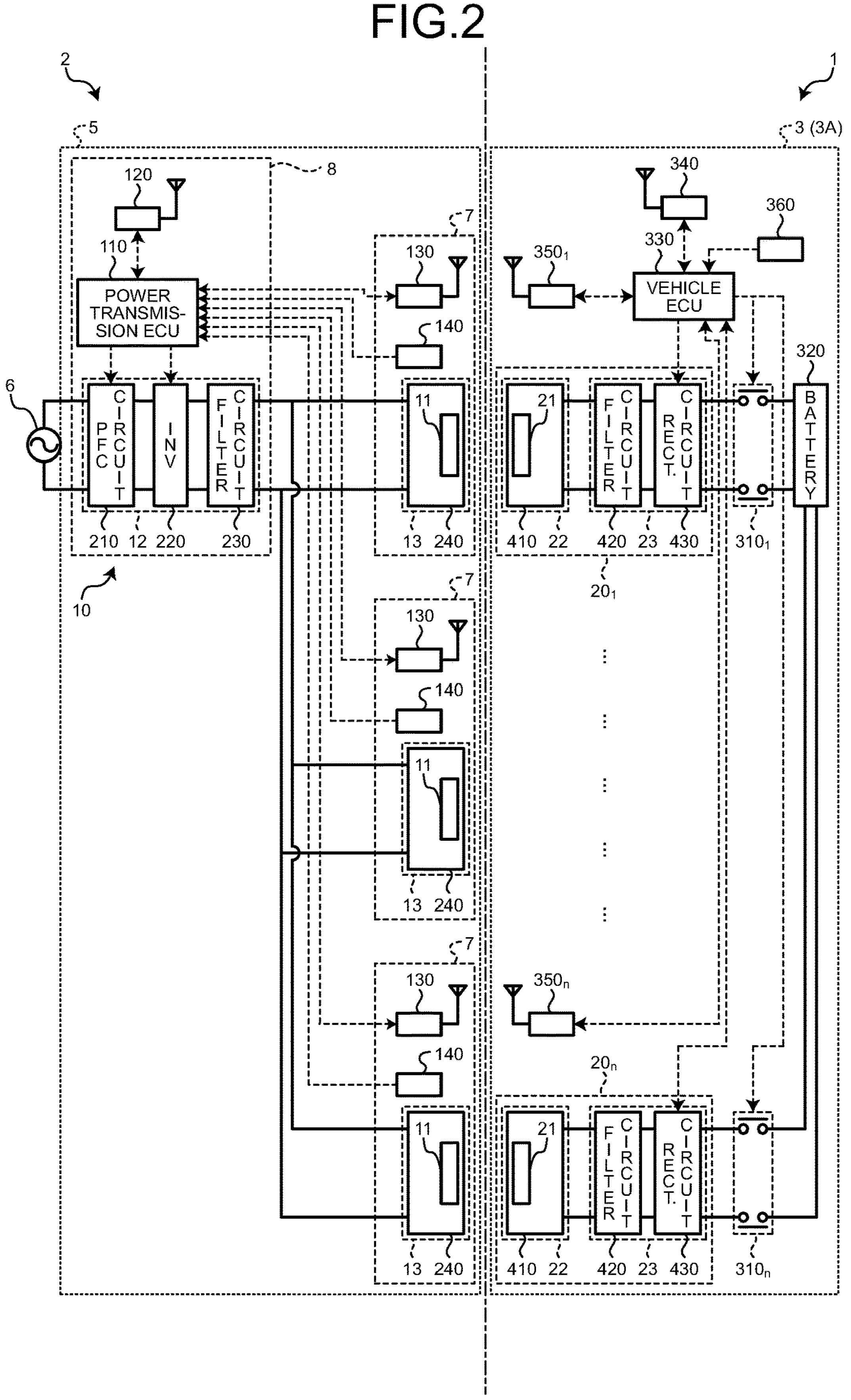
FIG. 2 is a diagram illustrating an overall configuration of the wireless power transfer system.
Figure 3:
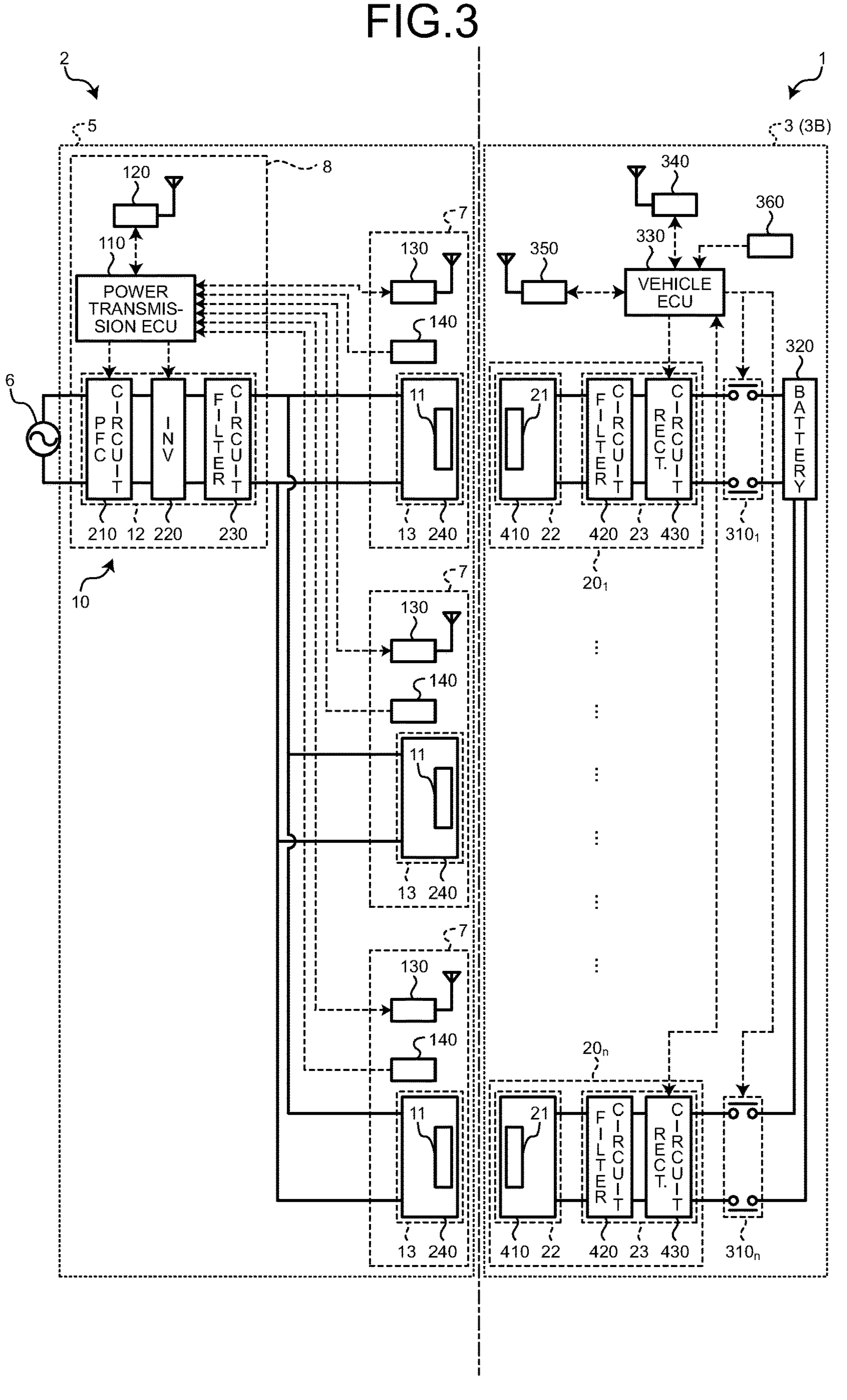
FIG. 3 is a diagram illustrating an overall configuration of the wireless power transfer system.

FIGS. 2 and 3 are diagrams illustrating an overall configuration of a wireless power transfer system. In the wireless power transfer systems 1 of FIGS. 2 and 3, the configurations of the supply facilities 2 are the same, just with some differences in configurations of a vehicle 3A and a vehicle 3B. Hereinafter, the supply facility 2, the vehicle 3A, and the vehicle 3B will be described in this order.

Functional Configuration of Supply Device

In the supply facility 2, the supply device 5 and the AC power supply 6 are electrically connected to each other. In the supply device 5, the segment 7 and the management device 8 are electrically connected to each other. The supply device 5 includes a configuration provided in the management device 8 and a configuration provided in the segment 7. The supply device 5 includes a power transmission device 10, a power transmission electronic control unit (power transmission ECU) 110, a first communication device 120, a second communication device 130, and a foreign object detection device 140.

The power transmission device 10 includes an electric circuit connected to the AC power supply 6. The power transmission device 10 includes a power factor correction (PFC) circuit 210, an inverter (INV) 220, a filter circuit 230, and a power transmission-side resonant circuit 240.

The PFC circuit 210 improves the power factor of the AC power input from the AC power supply 6, converts the AC power into DC power, and outputs the obtained DC power to the inverter 220. The PFC circuit 210 includes an AC/DC converter. The PFC circuit 210 is electrically connected to the AC power supply 6.

The inverter 220 converts DC power input from the PFC circuit 210 into AC power. Each switching element of the inverter 220 is formed with a device such as an Insulated Gate Bipolar Transistor (IGBT) and a Metal-Oxide-Semiconductor Field Effect Transistor (MOSFET), and performs switching operations according to a control signal from the power transmission ECU 110. For example, the operating frequency of the inverter 220 is 85 kHz. The inverter 220 outputs the AC power obtained by conversion to the filter circuit 230.

The filter circuit 230 removes noise included in the alternating current input from the inverter 220, and supplies the AC power from which the noise has been removed to the power transmission-side resonant circuit 240. The filter circuit 230 is an LC filter combining a coil and a capacitor. For example, the filter circuit 230 includes a T-type filter having two coils and one capacitor arranged in a T-shape. The PFC circuit 210, the inverter 220, and the filter circuit 230 constitute a power conversion unit 12 of the power transmission device 10.

The power transmission-side resonant circuit 240 is a power transmitter that uses contactless power transfer to transfer the AC power supplied from the filter circuit 230 to the power reception device 20. When AC power is supplied from the filter circuit 230 to the power transmission-side resonant circuit 240, a current flows through the primary coil 11 to generate a magnetic field for power transmission.

The power transmission-side resonant circuit 240 includes the primary coil 11 and a resonant capacitor. The primary coil 11 is a power transmission coil. The resonant capacitor is connected in series to one end of the primary coil 11, and adjusts a resonant frequency of the power transmission-side resonant circuit. This resonant frequency is 10 kHz to 100 GHz, preferably 85 kHz. For example, the power transmission device 10 has a configuration enabling the match between the resonant frequency of the power transmission-side resonant circuit 240 and the operating frequency of the inverter 220. The power transmission-side resonant circuit 240 constitutes a primary device 13 of the power transmission device 10.

The power transmission device 10 includes the power conversion unit 12 and the primary device 13. The power conversion unit 12 includes the PFC circuit 210, the inverter 220, and the filter circuit 230. The primary device 13 includes the power transmission-side resonant circuit 240. The power transmission device 10 has a configuration in which the power conversion unit 12 is provided in the management device 8 while the primary device 13 is provided in the segment 7.

In the supply device 5, the power conversion unit 12 of the power transmission device 10, the power transmission ECU 110, and the first communication device 120 are provided in the management device 8, while the primary device 13 of the power transmission device 10, the second communication device 130, and the foreign object detection device 140 are provided in the segment 7.

The power transmission ECU 110 is an electronic control device that controls the supply device 5. The power transmission ECU 110 includes a processor and memory. The processor includes a central processing unit (CPU), a digital signal processor (DSP), a field-programmable gate array (FPGA), and the like. The memory is a main storage device, and includes random access memory (RAM), read only memory (ROM), and the like. The power transmission ECU 110 loads a program stored in the storage unit into the work area of the memory (main storage device) and executes the program. Through execution of the program, the power transmission ECU 110 controls individual components, thereby actualizing a function that matches a predetermined purpose. The storage unit includes a recording medium such as erasable programmable ROM (EPROM), a hard disk drive (HDD), and a removable medium. Examples of the removable medium include disc recording media such as a universal serial bus (USB) flash drive, a compact disc (CD), a digital versatile disc (DVD), and a Blu-ray (registered trademark) disc (BD). The storage unit can store an operating system (OS), various programs, various tables, various databases, and the like. Signals from various sensors are input to the power transmission ECU 110. A signal from the foreign object detection device 140 is input to the power transmission ECU 110. The power transmission ECU 110 executes various controls based on the signals input from the various sensors.

For example, the power transmission ECU 110 executes power control of adjusting transmission power. In the power control, the power transmission ECU 110 controls the power transmission device 10. The power transmission ECU 110 outputs a control signal to the power conversion unit 12 in order to control the power to be supplied from the power conversion unit 12 to the primary device 13. The power transmission ECU 110 controls switching elements included in the PFC circuit 210 to adjust transmission power, and controls switching elements included in the inverter 220 to adjust the transmission power.

In addition, the power transmission ECU 110 executes communication control of controlling communication with the vehicle 3. In the communication control, the power transmission ECU 110 controls the first communication device 120 and the second communication device 130.

The first communication device 120 is an on-ground communication device that performs wide-area wireless communication. The first communication device 120 performs wireless communication with the vehicle 3 before approaching the WPT lane among the vehicles 3 being in motion on the road 4. The state before approaching the WPT lane means that the vehicle 3 is at a position not capable of performing short-range wireless communication with the supply device 5.

The wide-area wireless communication is communication performed over a communication distance of 10 meters to 10 kilometers. The wide-area wireless communication is communication performed over a longer communication distance compared with the short-range wireless communication. The wide-area wireless communication can be performed using various types of wireless communication having a long communication distance. For example, the wide-area wireless communication uses communication conforming to communication standards formulated by IEEE, such as 3GPP (registered trademark), 4G, LTE, 5G, and WiMAX. The wireless power transfer system 1 uses wide-area wireless communication to transmit vehicle information associated with vehicle identification information (vehicle ID) from the vehicle 3 to the supply device 5.

The second communication device 130 is an on-ground communication device that performs short-range wireless communication. The second communication device 130 performs wireless communication with the vehicle 3 that has approached or entered the WPT lane among the vehicles 3 being in motion on the road 4. The state of approaching the WPT lane means that the vehicle 3 is at a position capable of performing short-range wireless communication with the supply device 5.

The short-range wireless communication is communication performed over a communication distance less than 10 meters. The short-range wireless communication is communication performed over a shorter communication distance compared with wide-area wireless communication. The short-range wireless communication can be performed using various short-distance wireless communication having a short communication distance. For example, the short-range wireless communication uses communication conforming to a certain communication standard formulated by an institute such as IEEE, ISO, and IEC. As an example, short-range wireless communication uses a standard such as Wi-Fi (registered trademark), Bluetooth (registered trademark), and ZigBee (registered trademark). Other technologies that can be used for performing short-range wireless communication include Radio Frequency Identification (RFID) and Dedicated Short Range Communication (DSRC). The wireless power transfer system 1 uses short-range wireless communication to transmit information such as vehicle identification information from the vehicle 3 to the supply device 5.

The foreign object detection device 140 detects a metal foreign object, a living object, or the like existing above the primary coil 11. The foreign object detection device 140 includes a sensor coil or an imaging device, installed on the ground, for example. The foreign object detection device 140 exerts a foreign object detection (FOD) function and a living object protection (LOP) function in the wireless power transfer system 1.

In the supply device 5, the configuration of the power transmission device 10 is divided into the segment 7 and the management device 8, and the three segments 7 are connected to one management device 8. The power transmission device 10 has a configuration in which one inverter supplies power to three power transmission-side resonant circuits 240. In the supply device 5, a signal from each segment 7 is input to the management device 8. Signals from the second communication device 130 and the foreign object detection device 140 provided in the first segment are input to the power transmission ECU 110. Similarly, signals from the second communication device 130 and the foreign object detection device 140 provided in the second segment are input to the power transmission ECU 110. Signals from the second communication device 130 and the foreign object detection device 140 provided in the third segment are input to the power transmission ECU 110. The power transmission ECU 110 can grasp the state of each segment 7 based on the signal input from each segment 7.

Functional Configuration of Vehicle

First, the functional configuration of the vehicle 3A will be described. As illustrated in FIG. 2, the vehicle 3A includes power reception devices $\mathbf{20}_1$ to $\mathbf{20}_n$ (n=an integer of 2 or more), charging relays $\mathbf{310}_1$ to $\mathbf{310}_n$ (n=an integer of 2 or more), a battery 320, a vehicle ECU 330, a third communication device 340, fourth communication devices $\mathbf{350}_1$ to $\mathbf{350}_n$ (n=an integer of 2 or more), and a global positioning system (GPS) receiver 360. Hereinafter, when referring to one of the power reception devices $\mathbf{20}_1$ to $\mathbf{20}_n$, the device is simply described as the power reception device 20. Furthermore, when referring to one of the fourth communication devices $\mathbf{350}_1$ to $\mathbf{350}_n$, the device is simply described as the fourth communication device 350. When referring to either the vehicle 3A or the vehicle 3B, the vehicle is simply described as the vehicle 3.

The power reception device 20 supplies the power received from the power transmission device 10 to the battery 320. The power reception device 20 is electrically connected to the battery 320 via the charging relay 310. The power reception device 20 includes a power reception-side resonant circuit 410, a filter circuit 420, and a rectifier circuit 430.

The power reception-side resonant circuit 410 is a power receiver that receives power transferred from the power transmission device 10 using contactless power transfer. The power reception-side resonant circuit 410 is formed with a power reception-side resonant circuit which includes a secondary coil 21 and a resonant capacitor. The secondary coil 21 is a power receiving coil that receives power transferred from the primary coil 11 using contactless power transfer. The resonant capacitor is connected in series to one end of the secondary coil 21, and adjusts a resonant frequency of the power reception-side resonant circuit. The resonant frequency of the power reception-side resonant circuit 410 is determined to match the resonant frequency of the power transmission-side resonant circuit 240.

The resonant frequency of power reception-side resonant circuit 410 is the same as the resonant frequency of power transmission-side resonant circuit 240. Therefore, when a magnetic field is generated by the power transmission-side resonant circuit 240 in a state where the power reception-side resonant circuit 410 faces the power transmission-side resonant circuit 240, vibration of the magnetic field is transmitted to the power reception-side resonant circuit 410. As a result, the primary coil 11 and the secondary coil 21 are brought into a resonance state. When an induced current flows through the secondary coil 21 by electromagnetic induction, an induced electromotive force is generated in the power reception-side resonant circuit 410. Power transferred from the power transmission-side resonant circuit 240 via contactless power transfer in this manner is received by the power reception-side resonant circuit 410. The power reception-side resonant circuit 410 supplies the power received from the power transmission-side resonant circuit 240 to the filter circuit 420. The power reception-side resonant circuit 410 constitutes a secondary device 22 of the power reception device 20.

The filter circuit 420 removes noise included in the alternating current input from the power reception-side resonant circuit 410, and outputs the AC power from which the noise has been removed to the rectifier circuit 430. The filter circuit 420 is an LC filter combining a coil and a capacitor. For example, the filter circuit 420 includes a T-type filter having two coils and one capacitor arranged in a T-shape.

The rectifier circuit 430 converts AC power input from the filter circuit 420 into DC power and outputs the obtained DC power to the battery 320. The rectifier circuit 430 includes a full-bridge circuit in which four diodes are connected by full-bridge connection as rectifier elements, for example. A switching element is connected in parallel to each diode of the rectifier circuit 430. Each switching element of the rectifier circuit 430 is constituted by an IGBT, and performs switching operations according to the control signal from the vehicle ECU 330. The rectifier circuit 430 supplies the DC power obtained by conversion to the battery 320. The filter circuit 420 and the rectifier circuit 430 constitute a power conversion unit 23 of the power reception device 20.

The power reception device 20 includes the secondary device 22 and the power conversion unit 23. The secondary device 22 includes the power reception-side resonant circuit 410. The power conversion unit 23 includes the filter circuit 420 and the rectifier circuit 430.

The charging relay 310 is provided between the rectifier circuit 430 and the battery 320. Open/closed states of the charging relay 310 are controlled by the vehicle ECU 330. The charging relay 310 is controlled to be set to the closed state when the battery 320 is charged by the power transmission device 10. When the charging relay 310 is in the closed state, the rectifier circuit 430 and the battery 320 are connected to each other to enable energization. When the charging relay 310 is in the open state, the rectifier circuit 430 and the battery 320 are disconnected from each other to disable energization. For example, when the charging relay 310 is in the open state, the vehicle 3 does not issue a power supply request.

The battery 320 is a rechargeable DC power supply, and is formed with a lithium ion battery, a nickel hydrogen battery, or the like. The battery 320 stores power supplied from the power transmission device 10 to the power reception device 20. In addition, the battery 320 can supply power to a travel motor of the vehicle 3. The battery 320 is electrically connected to the travel motor via a power control unit (PCU). The PCU is a power conversion device that converts DC power of the battery 320 into AC power and supplies the obtained AC power to the travel motor. Each switching element of the PCU is constituted by an IGBT, and performs switching operations according to a control signal from the vehicle ECU 330.

The vehicle ECU 330 is an electronic control device that controls the vehicle 3. The vehicle ECU 330 has a hardware configuration similar to that of the power transmission ECU 110. Signals from various sensors mounted on the vehicle 3 are input to the vehicle ECU 330. Furthermore, a positioning signal received by the GPS receiver 360 is input to the vehicle ECU 330. The vehicle ECU 330 can acquire current position information of the vehicle 3 from the GPS receiver 360. The vehicle ECU 330 executes various controls based on signals input from various sensors.

For example, the vehicle ECU 330 executes contactless charge control including transfer of power from the primary coil 11 to the secondary coil 21 using contactless power transfer, and storage of the power received by the secondary coil 21 in the battery 320. In the contactless charge control, the vehicle ECU 330 controls the rectifier circuit 430, the charging relay 310, the third communication device 340, and the fourth communication device 350. The contactless charge control includes power control of controlling charging power and communication control of controlling communication with the supply device 5. In the power control, the vehicle ECU 330 controls the switching element included in the rectifier circuit 430 to adjust power (charging power) supplied from the power reception device 20 to the battery 320. In the communication control, the vehicle ECU 330 controls the third communication device 340 and the fourth communication device 350.

In addition, the vehicle ECU 330 determines power to be received by each of the power reception devices $\mathbf{20}_1$ to $\mathbf{20}_n$ from the supply device 5, and transmits power information related to the determined power to the supply device 5. Furthermore, the vehicle ECU 330 causes the fourth communication devices $\mathbf{350}_1$ to $\mathbf{350}_n$ respectively corresponding to the power reception devices $\mathbf{20}_1$ to $\mathbf{20}_n$ to transmit power information related to the power to be received individually by the power reception devices $\mathbf{20}_1$ to $\mathbf{20}_n$ from the supply device 5. Furthermore, the vehicle ECU 330 causes the third communication device 340 to transmit the maximum values of the power received individually by the power reception devices $\mathbf{20}_1$ to $\mathbf{20}_n$ from the supply device 5 as well as the total power information, which is information related to the total power obtained by adding up the maximum values of power to be received individually by the power reception devices $\mathbf{20}_1$ to $\mathbf{20}_n$ from the supply device 5. When there is a power reception device 20 with a failure among the plurality of power reception devices $\mathbf{20}_1$ to $\mathbf{20}_n$, the vehicle ECU 330 opens (turns it to the open state) the charging relay 310 corresponding to the power reception device 20 with a failure. In the embodiment, the vehicle ECU 330 functions as a processor.

The third communication device 340 is an on-vehicle communication device that performs wide-area wireless communication. The third communication device 340 performs wireless communication with the first communication device 120 of the supply device 5 in a state before the vehicle 3 being in motion on the road 4 approaches the WPT lane. The wide-area wireless communication is bidirectional wireless communication. Communication performed between the first communication device 120 and the third communication device 340 is high-speed wireless communication.

The fourth communication device 350 is an on-vehicle communication device that performs short-range wireless communication. The fourth communication device 350 performs wireless communication with the second communication device 130 of the supply device 5 in a state where the vehicle 3 has approached or entered the WPT lane. The short-range wireless communication is unidirectional wireless signaling. The unidirectional wireless signaling is Peer to Peer Signaling (P2PS). P2PS is used to notify the vehicle identification information from the vehicle 3 to the supply device 5 in each activity of Pairing, Alignment check, Magnetic Coupling Check, and Power transfer terminated. The P2PS can also be used as a means of alignment check in the lateral direction. The lateral direction is the width direction of the lane and corresponds to the width direction of the vehicle 3. In the vehicle 3A, the fourth communication devices $\mathbf{350}_1$ to $\mathbf{350}_n$ are provided corresponding to the power reception devices $\mathbf{20}_1$ to $\mathbf{20}_n$, respectively. That is, in the vehicle 3A, the fourth communication devices 350 are provided as many as the number of the power reception devices 20. In addition, the vehicle 3A is provided with charging relays $\mathbf{310}_1$ to $\mathbf{310}_n$ corresponding to the plurality of power reception devices $\mathbf{20}_1$ to $\mathbf{20}_n$, respectively.

The GPS receiver 360 detects the current position of the vehicle 3 based on positioning information obtained from a plurality of positioning satellites. The current position information of the vehicle 3 detected by the GPS receiver 360 is transmitted to the vehicle ECU 330.

Next, a configuration of the vehicle 3B will be described. As illustrated in FIG. 3, the vehicle 3B has a configuration similar to that of the vehicle 3A, and includes power reception devices $\mathbf{20}_1$ to $\mathbf{20}_n$ (n=an integer of 2 or more), charging relays $\mathbf{310}_1$ to $\mathbf{310}_n$ (n=an integer of 2 or more), a battery 320, a vehicle ECU 330, a third communication device 340, one fourth communication device 350, and a global positioning system (GPS) receiver 360. Therefore, a detailed description of each component constituting the vehicle 3B will be omitted.

In the supply device 5, the filter circuit 230 may be included in the management device 8 instead of in the segment 7. That is, the filter circuit 230 may be installed beside the road 4. In this case, the power conversion unit 12 includes the PFC circuit 210, the inverter 220, and the filter circuit 230, while the primary device 13 includes the power transmission-side resonant circuit 240.

In addition, the filter circuit 230 may be individually provided in the primary coil 11, or may be collectively provided across the plurality of primary coils 11.

Furthermore, the filter circuit 230 is not limited to the T-type filter, and may be a band pass filter in which a coil and a capacitor are connected in series, for example. The similar applies to the filter circuit 420 of the vehicle 3.

Furthermore, in the power transmission device 10, each of the primary devices 13 includes a changeover switch that switches the primary coil 11 as an energization target when the inverter 220 is connected to the plurality of primary coils 11. The changeover switch may be provided in the management device 8 beside the road 4 or may be provided near the primary coil 11.

The power transmission-side resonant circuit 240 is not limited to the configuration in which primary coil 11 and the resonant capacitor are connected in series. The primary coil 11 and the resonant capacitor may be connected in parallel, or may be connected in parallel and in series in combination. In short, the power transmission-side resonant circuit 240 only needs to have a configuration in which the resonant frequency of the power transmission-side resonant circuit 240 matches the operating frequency of the inverter 220, and the connection relationship among the components is not particularly limited. The similar applies to the power reception-side resonant circuit 410 of the vehicle 3.

The operating frequency of the inverter 220 is not limited to 85 kHz, and may be a frequency around 85 kHz. In short, the operating frequency of the inverter 220 may be a predetermined frequency band including 85 kHz.

The power transmission device 10 may have a configuration in which a plurality of the inverters 220 is connected to an output-side power line (DC power line) of the PFC circuit 210.

The foreign object detection device 140 may be provided not only on the ground but also on the vehicle 3. For example, when the foreign object detection device on the vehicle 3 side has detected an object such as a foreign object and a living object existing above the primary coil 11, the power supply request can be stopped until the vehicle 3 passes through the primary coil 11.

In addition, in the wireless power transfer system 1, the information transmitted from the vehicle 3 to the supply device 5 using the short-range wireless communication includes a power supply request, a supplied power request value, and the like in addition to the vehicle identification information. The power supply request is information indicating a request for power transfer from the primary coil 11. The supplied power request value is a request value of the amount of power to be transferred from the supply device 5 to the vehicle 3. The vehicle ECU 330 can calculate the supplied power request value based on the SOC of the battery 320.

The wireless power transfer system 1 is not limited to the method of supplying power from the ground to the vehicle 3, and can also implement a method of supplying power from the vehicle 3 to the ground. In this case, the rectifier circuit 430 can be replaced with an inverter to implement power supply and rectification at the time of power reception.

Outline of Wide-Area Wireless Communication

Figure 4:
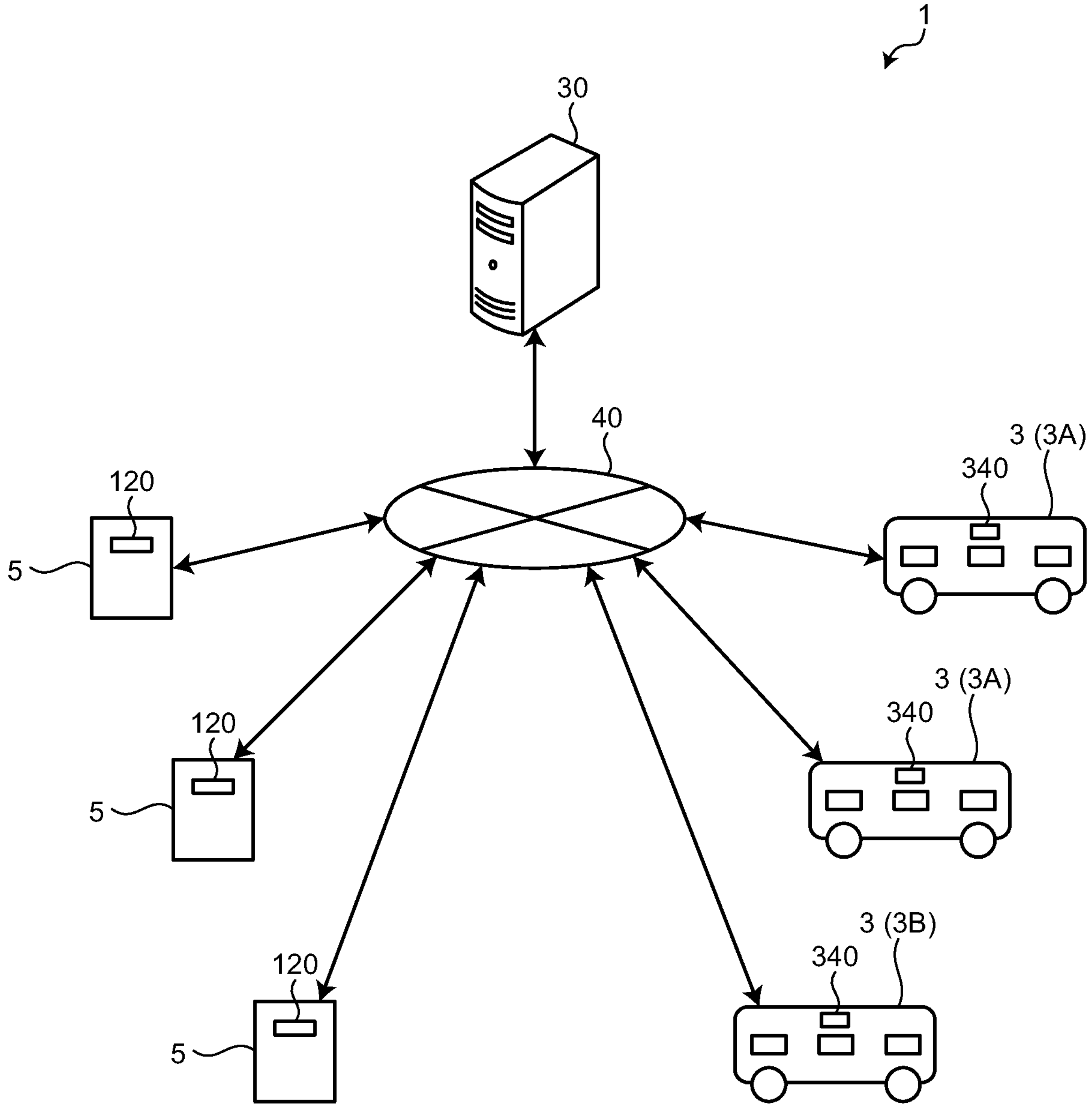
FIG. 4 is a schematic diagram illustrating wide-area wireless communication in a wireless power transfer system.

FIG. 4 is a schematic diagram illustrating wide-area wireless communication in a wireless power transfer system.

In the wireless power transfer system 1, while the vehicle 3 (3A, 3B) can communicate with the server 30, also the supply device 5 can communicate with the server 30. The server 30 is connected to a network 40 and can communicate with the plurality of vehicles 3 and the plurality of supply devices 5 via the network 40. The network 40 is formed with a network such as a wide area network (WAN) being a public communication network such as the Internet, and a telephone communication network of a mobile phone.

The vehicle 3 is connected to the network 40 by wide-area wireless communication using the third communication device 340. The vehicle 3 transmits information to the server 30 and receives information from the server 30.

The supply device 5 is connected to the network 40 by wide-area wireless communication that uses the first communication device 120. The supply device 5 transmits information to the server 30 and receives information from the server 30.

Functional Configuration of Power Transmission ECU

Figure 5:
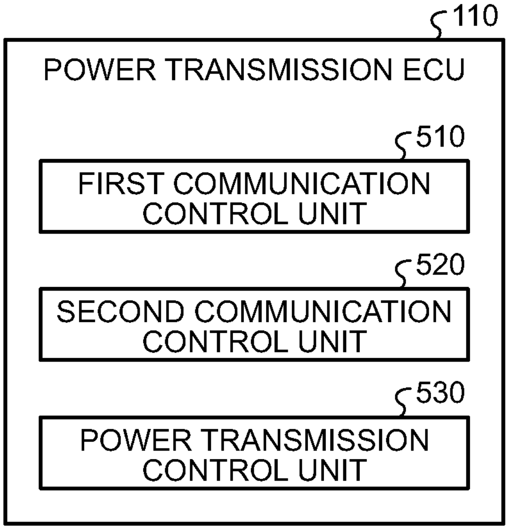
FIG. 5 is a block diagram illustrating a functional configuration of a power transmission ECU.

FIG. 5 is a block diagram illustrating a functional configuration of the power transmission ECU. The power transmission ECU 110 includes a first communication control unit 510, a second communication control unit 520, and a power transmission control unit 530.

The first communication control unit 510 executes first communication control of controlling the first communication device 120. The first communication control controls wide-area wireless communication on the supply device 5 side, and controls communication of the supply device 5 that uses the first communication device 120. That is, the first communication control controls communication of the management device 8 of the supply device 5. The first communication control controls communication between the supply device 5 and the network 40 and also controls communication between the supply device 5 and the server 30 via the network 40. The first communication control unit 510 is a Supply Equipment Communication Controller (SECC).

The second communication control unit 520 executes second communication control of controlling the second communication device 130. The second communication control is the control of short-range wireless communication on the supply device 5 side, and controls communication of the supply device 5 that uses the second communication device 130. That is, the second communication control controls communication of the segment 7 of the supply device 5. The second communication control controls communication between the supply device 5 and the vehicle 3 as communication without using the network 40. The second communication control unit 520 is a Primary Device Communication Controller (PDCC).

The power transmission control unit 530 executes power transmission control of controlling the power transmission device 10. The power transmission control controls transmission power, and controls the power conversion unit 12 of the power transmission device 10. The power transmission control unit 530 executes power control of controlling the PFC circuit 210 and the inverter 220.

Functional Configuration of Vehicle ECU

Figure 6:
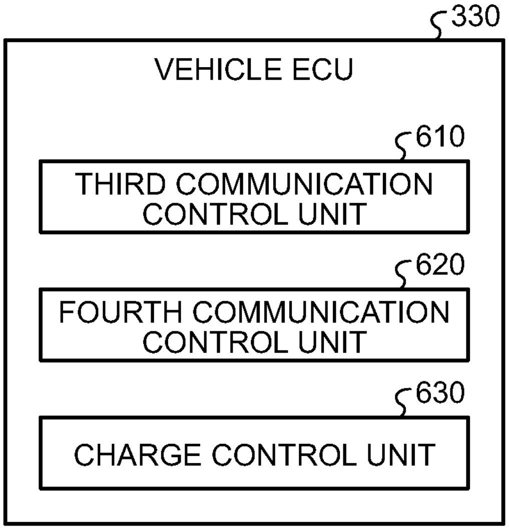
FIG. 6 is a block diagram illustrating a functional configuration of a vehicle ECU.

FIG. 6 is a block diagram illustrating a functional configuration of the vehicle ECU. The vehicle ECU 330 includes a third communication control unit 610, a fourth communication control unit 620, and a charge control unit 630.

The third communication control unit 610 executes third communication control that controls the third communication device 340. The third communication control controls wide-area wireless communication on the vehicle 3 side, and controls communication of the vehicle 3 using the third communication device 340. The third communication control controls communication between the vehicle 3 and the network 40 and also controls communication between the vehicle 3 and the server 30 via the network 40. The third communication control unit 610 is an EV Communication Controller (EVCC).

The fourth communication control unit 620 executes fourth communication control of controlling the fourth communication device 350. The fourth communication control controls short-range wireless communication on the vehicle 3 side, and controls communication of the vehicle 3 using the fourth communication device 350. The fourth communication control controls communication between the vehicle 3 and the supply device 5 as communication without using the network 40. The fourth communication control unit 620 is a Secondary Device Communication Controller (SDCC).

The charge control unit 630 executes charge control of controlling the power reception device 20 and the charging relay 310. The charge control includes power control of controlling received power in the secondary device 22 and relay control of controlling a connection state between the secondary device 22 and the battery 320. The charge control unit 630 executes power control of controlling the rectifier circuit 430. The charge control unit 630 executes relay control of switching open/closed states of the charging relay 310.

In the wireless power transfer system 1 configured like this, wireless power transfer from the supply device 5 to the vehicle 3 is performed in a state where wireless communication is established between the vehicle 3 and the supply device 5. With the vehicle 3 and the supply device 5 paired by wireless communication, power is transferred from the primary coil 11 on the ground to the secondary coil 21 on the vehicle using contactless power transfer. Subsequently, the vehicle 3 performs charge control of supplying the power received by the secondary coil 21 to the battery 320.

Outline of Power Transfer Process

Next, a power transfer process (D-WPT process) will be described with reference to FIG. 7. The power transfer process is a process structured as a chain of a plurality of activities and derived from states and corresponding transitions.

Figure 7:
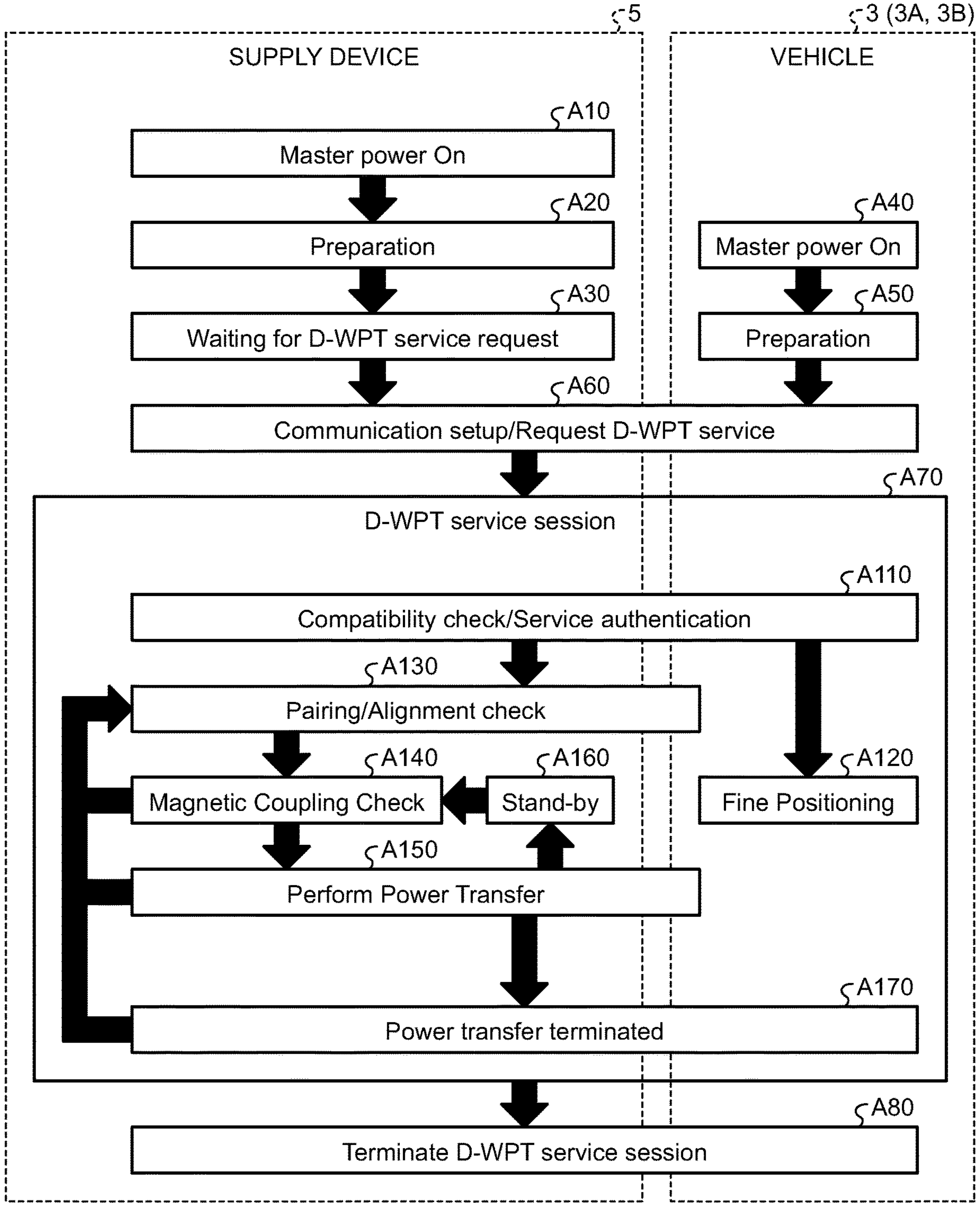
FIG. 7 is a diagram illustrating a power transfer process.

FIG. 7 is a diagram illustrating the power transfer process. FIG. 7 illustrates basic activities for describing the power transfer process. The thick arrows in FIG. 7 represent transition lines. The states of the wireless power transfer system 1 in the power transfer process are represented by the activities that constitute the power transfer process.

The activities constituting the power transfer process include: a power transfer service session (D-WPT service session A70), which is activity at a stage of performing power transfer; activity at a stage before performing power transfer; and activity at a stage after performing power transfer. Furthermore, the activities can be described by dividing the operation subject according to the presence or absence of communication between the supply device 5 and the vehicle 3. The activities are divided into a state of only the supply device 5 without communication, a state of only the vehicle 3 without communication, and states of both the supply device 5 and the vehicle 3 with communication.

As illustrated in FIG. 7, the activity includes: Master power On A10; Preparation A20; Waiting for D-WPT service request A30 from the vehicle 3; Master power On A40; Preparation A50; Communication setup/Request D-WPT service A60; D-WPT service session A70; and Terminate D-WPT service session A80.

Preparation A20 is a preparation state of the supply device 5. In Preparation A20, the supply device 5 performs circuit activation and safety confirmation without communicating with the vehicle 3. When the state is Master power ON A10, the supply device 5 transitions to the state of Preparation A20. In a case where the supply device 5 successfully completes circuit activation and safety confirmation in Preparation A20, the state of the power transfer process transitions to Waiting for D-WPT service request A30 from the vehicle 3. In contrast, when there is a problem in the supply device 5, the supply device 5 uses wide-area wireless communication to notify the vehicle 3 of information (unavailability notification) indicating that the wireless power transfer system 1 is unavailable. The first communication device 120 transmits the unavailability notification to the vehicle 3.

Preparation A50 is a preparation state of the vehicle 3. In Preparation A50, the vehicle 3 performs circuit activation and safety confirmation without communicating with the supply device 5. In Master power ON state A40, the vehicle 3 transitions to the state of Preparation A50. Subsequently, when the vehicle 3 successfully completes circuit activation and safety confirmation in Preparation A50, the state of the power transfer process transitions to Communication setup/Request D-WPT service A60. In contrast, when there is a problem in the vehicle 3, the vehicle 3 does not start wide-area wireless communication and does not perform the subsequent sequence in the D-WPT process.

Communication setup/Request D-WPT service A60 is started by the vehicle ECU 330. At Communication setup/Request D-WPT service A60, the vehicle ECU 330 starts wide-area wireless communication. First, when the vehicle 3 transitions from Preparation A50 to the Communication setup/Request D-WPT service A60, the third communication device 340 transmits a D-WPT service request signal. The third communication device 340 performs wireless communication with the first communication device 120 corresponding to the D-WPT lane which the vehicle 3 is scheduled to enter or has entered. The first communication device 120 as a communication partner is selected based on a relative positional relationship between the current position of the vehicle 3 and the position of the D-WPT lane. On the supply device 5 side, when the first communication device 120 has received a D-WPT service request signal in the state of Waiting for D-WPT service request A30 from the vehicle 3, the state of the power transfer process transitions to Communication setup/Request D-WPT service A60. Various types of information of the wide-area wireless communication and the P2PS communication are linked by using vehicle identification information. A processing sequence of Communication setup/Request D-WPT service A60 is illustrated in FIG. 8.

Figure 8:
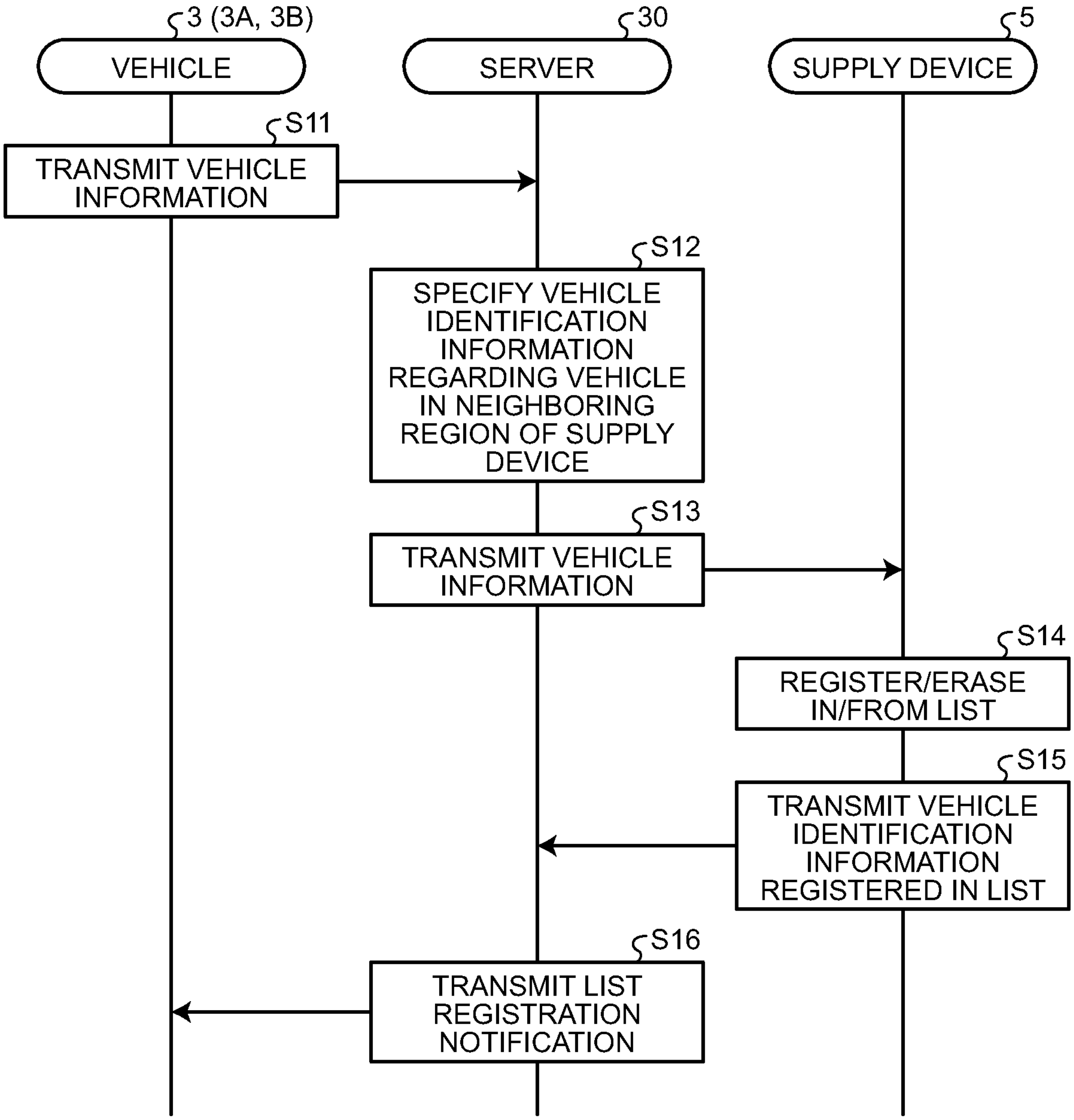
FIG. 8 is a sequence diagram illustrating a case where communication using wide-area wireless communication is performed between a vehicle and a supply device.

FIG. 8 is a sequence diagram illustrating a case where communication using wide-area wireless communication is performed between the vehicle 3 and the supply device 5.

The vehicle 3 transmits vehicle information to the server 30 (step S11). In step S11, the third communication device 340 of the vehicle 3 transmits the vehicle information to the server 30. The vehicle information includes vehicle identification information, various parameters of the power reception device 20, current position information of the vehicle 3, and requested power. The vehicle ECU 330 calculates the requested power based on State of Charge (SOC) of the battery 320. In step S11, the vehicle ECU 330 controls the third communication device 340 to transmit the vehicle information every predetermined time. The predetermined time is set according to the distance from the current position of the vehicle 3 to the start point of the WPT lane. The shorter the distance from the vehicle 3 to the start point of the WPT lane, the shorter the interval of the predetermined time.

When having received the vehicle information from the vehicle 3, the server 30 specifies the vehicle identification information of the vehicle 3 located in the neighboring region of the supply device 5 based on the current position information of the vehicle 3 included in the vehicle information (step S12). In step S12, the server 30 specifies the vehicle 3 located in a predetermined neighboring region from the supply device 5 based on the current position information of the vehicle 3 and the position information of the supply device 5. The neighboring region is set to a region within 500 meters, for example.

Having specified the vehicle identification information of the vehicle 3, the server 30 transmits the vehicle information to the supply device 5 (step S13). In step S13, the transmission device of the server 30 transmits the vehicle information to the supply device 5.

When having received the vehicle information from the server 30, the supply device 5 performs registration/erasure of the vehicle identification information in/from an identification information list (step S14). In step S14, the power transmission ECU 110 performs registration/erasure of the vehicle identification information in/from the identification information list such that the vehicle identification information associated with the vehicle information is to be registered in the identification information list without excess or deficiency.

Having completed registration/erasure of the vehicle identification information in/from the identification information list, the supply device 5 transmits the vehicle identification information registered in the identification information list to the server 30 (step S15). In step S15, the first communication device 120 of the supply device 5 transmits the vehicle identification information to the server 30.

When having received the vehicle identification information from the supply device 5, the server 30 transmits a list registration notification to the vehicle 3 corresponding to the vehicle identification information registered in the identification information list (step S16). In step S16, the communication device of the server 30 transmits the list registration notification to the vehicle 3. The list registration notification is a notification indicating that the vehicle identification information is registered in the identification information list. The list registration notification includes identification information of the supply device 5 and position information of the supply device 5.

In this manner, when the vehicle 3 starts the wide-area wireless communication and both the supply device 5 and the vehicle 3 are in the state of Communication setup/Request D-WPT service A60, it is determined that the communication setup by the wide-area wireless communication is successful. With this successful communication setup, the state transitions to D-WPT service session A70.

Returning to FIG. 7. In the D-WPT service session A70, power is transferred from the power transmission-side resonant circuit 240 of the supply device 5 to the power reception-side resonant circuit 410 of the vehicle 3 using contactless power transfer in a state where a communication link is established between the supply device 5 and the vehicle 3. The D-WPT service session A70 starts with the successful communication setup and ends upon termination of the communication. When communication is terminated in the state of D-WPT service session A70, the state transitions to Terminate D-WPT service session A80.

At Terminate D-WPT service session A80, the vehicle 3 terminates the wide-area wireless communication with the supply device 5. The vehicle 3 and the supply device 5 can receive a trigger for terminating the D-WPT service session A70. The vehicle ECU 330 controls so as not to allow D-WPT to be started for the secondary device 22 and the vehicle 3 until the third communication device 340 receives a next notification (D-WPT service request signal).

Details of D-WPT Service Session A70

Detailed activities of the D-WPT service session A70 will now be described.

The D-WPT service session A70 includes Compatibility check/Service authentication A110, Fine Positioning A120, Pairing/Alignment check A130, Magnetic Coupling Check A140, Perform Power Transfer A150, Stand-by A160, and Power transfer terminated A170.

Compatibility check/Service authentication A110 will be described. After the communication setup is successful, the vehicle ECU 330 and the power transmission ECU 110 confirm that the primary device 13 and the secondary device 22 are compatible. The compatibility check is performed on the supply device 5 side based on information associated with vehicle identification information acquired by communication. Items to be checked include the minimum ground level of the secondary device 22, the shape type of the secondary device 22, the circuit topology of the secondary device 22, the self-resonant frequency of the secondary device 22, and the number of secondary coils 21.

Initially in Compatibility check/Service authentication A110, the vehicle 3 transmits compatibility information of the power reception device 20 from the third communication device 340 to the supply device 5. The first communication device 120 of the supply device 5 receives the compatibility information of the power reception device 20 from the vehicle 3. Subsequently, the first communication device 120 of the supply device 5 transmits compatibility information of the power transmission device 10 to the vehicle 3. The third communication device 340 of the vehicle 3 receives the compatibility information of the power transmission device 10 from the supply device 5.

Elements of the compatibility information transmitted by the vehicle 3 to the supply device 5 include vehicle identification information, WPT power classes, Air Gap Class, WPT operating frequencies, WPT frequency adjustment, WPT type, WPT circuit topology, fine positioning method, pairing method, alignment method, and power adjustment function presence/absence information.

Elements of the compatibility information transmitted from the supply device 5 to the vehicle 3 include supply device identification information, WPT power classes, Air Gap Class, a WPT operating frequencies, WPT frequency adjustment, a WPT type, a WPT circuit topology, a fine positioning method, a pairing method, an alignment method, and power adjustment function presence/absence information.

Each element will be described in detail. Hereinafter, each element of the compatibility information transmitted from the vehicle 3 to the supply device 5 will be described. Part of the description of the compatibility information transmitted from the supply device 5 to the vehicle 3 overlapping with the compatibility information transmitted from the vehicle 3 to the supply device 5 will be omitted.

Air gap class is information indicating an air gap class receivable by the secondary device 22.

The WPT power class is information indicating a power class receivable by the secondary device 22.

The WPT operating frequencies is information indicating frequencies of received power, which is to be received by the secondary device 22.

The WPT frequency adjustment is information indicating whether to adjust the operating frequency.

The WPT type is information indicating a shape type of the secondary device 22, and specifically indicates a coil shape of the secondary coil 21. Examples of the WPT type include a circle and a solenoid.

The WPT circuit topology is information indicating a connection structure between the secondary coil 21 and the resonant capacitor. The WPT circuit topologies include series and parallel connections.

The fine positioning method is information indicating a specific method of performing positioning when performing the positioning.

The pairing method is a method by which the vehicle 3 performs pairing of specifying the supply device 5.

The alignment method is a method of relatively confirming the positions of the secondary device 22 and the primary device 13 before starting power transmission.

The Fine Positioning A120 in the vehicle lateral direction will be described.

The vehicle 3 performs Fine Positioning A120 in the vehicle lateral direction prior to Pairing/Alignment check A130 or in parallel with these activities. When having determined that the vehicle 3 has approached or entered the area (WPT lane) where the supply device 5 is installed, the vehicle ECU 330 starts Fine Positioning A120 in the vehicle lateral direction.

The vehicle ECU 330 guides the vehicle 3 to align the primary device 13 and the secondary device 22 within a range that establishes sufficient magnetic coupling for wireless power transfer.

The Fine Positioning A120 in the vehicle lateral direction is basically performed manually or automatically on the vehicle 3 side. The Fine Positioning A120 in the vehicle lateral direction can be performed in cooperation with an advanced driver assistance system (ADAS).

The activity of the Fine Positioning A120 in the vehicle lateral direction continues until the vehicle 3 leaves the D-WPT charging site or the state changes to the termination of communication. The activity can be executed based on the positioning information transmitted from the supply device 5 to the vehicle 3 by wide-area wireless communication. This communication termination corresponds to Terminate D-WPT service session A80.

Pairing/Alignment check A130 will be described. Here, pairing and alignment check will be separately described.

First, pairing will be described.

The P2PS interface that performs short-range wireless communication ensures that the primary device 13 and the secondary device 22 are uniquely paired. The pairing state includes the following processes.

First, the vehicle ECU 330 recognizes that the vehicle 3 has approached or entered the D-WPT lane. For example, the vehicle ECU 330 has map information including the D-WPT lane, and compares the map information with the position information of the host vehicle obtained by the GPS receiver 360 to recognize approach or entry with a straight-line distance or the like. Using wide-area wireless communication, the vehicle 3 transmits to the server 30 which D-WPT lane the vehicle 3 has approached. In short, the third communication device 340 notifies the cloud with a signal indicating that the vehicle 3 has approached one of the D-WPT lanes. Furthermore, when the vehicle ECU 330 recognizes the approach or entry of the vehicle 3 to the D-WPT lane, the fourth communication device 350 starts transmitting a modulated signal at regular intervals in order to pair the primary device 13 and the secondary device 22.

The supply device 5 may recognize that the vehicle 3 has approached or entered the D-WPT lane using information acquired from the server 30 by wide-area wireless communication. The server 30 allocates the vehicle identification information of the vehicle 3 approaching in each D-WPT lane to the supply device 5 corresponding to the lane. The supply device 5 only needs to refer to the vehicle identification information which has been reduced in quantity by the server 30, enabling reduction of time for the authentication processing. When the supply device 5 recognizes that the vehicle 3 is approaching the D-WPT lane, the second communication device 130 enters the standby mode. In the standby mode, the device waits for reception of a modulated signal from the fourth communication device 350 of the vehicle 3. The modulated signal includes vehicle identification information.

When the second communication device 130 receives the modulated signal from the vehicle 3, the supply device 5 compares the vehicle identification information received by the short-range wireless communication with the vehicle identification information in the identification information list obtained as a result of the wide-area wireless communication with the plurality of vehicles 3 heading for the D-WPT lane. This comparison allows the supply device 5 to identify the vehicle 3.

When having recognized that the vehicle 3 is outside the D-WPT lane, the vehicle ECU 330 stops transmitting the modulated signal from the fourth communication device 350. The vehicle ECU 330 can determine whether the vehicle has passed through the D-WPT lane based on the map information and the position information of the host vehicle.

When having determined that the vehicle 3 is not traveling on the D-WPT lane or having determined that the vehicle 3 is not approaching the D-WPT lane, the supply device 5 stops waiting for the modulated signal from the fourth communication device 350.

Pairing is performed on the primary device 13 until the vehicle 3 exits the D-WPT charging site or the state changes to the termination of communication. When the pairing is complete, the state transitions to an alignment check.

Next, the alignment check will be described.

The alignment check is intended to confirm that the distance in the lateral direction between the primary device 13 and the secondary device 22 is within an acceptable range. The alignment check is performed by using short-range wireless communication (P2PS).

The alignment check is continuously executed based on the P2PS until the vehicle 3 leaves the D-WPT charging site or the state changes to the termination of communication. The result of the alignment check can be transmitted from the first communication device 120 to the third communication device 340 by wide-area wireless communication.

Magnetic Coupling Check A140 will be described.

In Magnetic Coupling Check A140, the supply device 5 checks the magnetic coupling state and checks that the secondary device 22 is within an acceptable range. After completion of Magnetic Coupling Check A140, the state transitions to Perform Power Transfer A150.

Perform Power Transfer A150 will be described.

In this state, the supply device 5 performs power transfer to the power reception device 20. The power transmission device 10 and the power reception device 20 need to have capability of controlling transfer power (transmission power and received power) to achieve the usefulness of MF-D-WPT and the protection of the power reception device 20 and the battery 320. The greater power transfer helps to increase a vehicle travel distance without static wireless charging and conductive charging of the power reception device 20. However, the capacity of the battery 320 varies depending on the vehicle type of the vehicle 3, and the driving power demand fluctuate suddenly in some cases. Examples of this sudden fluctuation include sudden regenerative braking. When the regenerative braking is performed while the vehicle is in motion in the D-WPT lane, the regenerative braking is prioritized, and thus, the received power from the power reception device 20 is supplied to the battery 320 in addition to the regenerative power. In this case, it is necessary to adjust the transfer power by the power reception device 20 in order to protect the battery 320 from overcharge.

In this state, communication is not to be newly started between the supply device 5 and the power reception device 20 despite the necessity of power control. This is because communication can compromise response and accuracy in power control due to instability and latency of communication. Therefore, the supply device 5 and the power reception device 20 perform power transfer and control of the power transfer based on known information obtained up to this state.

Using wide-area wireless communication in advance, the supply device 5 increases the transfer power of the magnetic coupling check in response to a power request transmitted from the third communication device 340. The supply device 5 suppresses the fluctuations in the current and voltage to be kept within their ranges and attempts to maximize the power transferred during the transition.

The power reception device 20 basically receives transmission power from the power transmission device 10 without any control. However, the power reception device 20 starts control when the transmission power has exceeded or is about to exceed the limit, such as the rated power of the battery 320 that varies according to the charge state or the driving power demand of the vehicle 3. In addition, the power control in the vehicle ECU 330 is also required to cope with malfunction in wide-area wireless communication. This malfunction leads to a contradiction between the power control target in the primary device 13 and the request from the third communication device 340, and a sudden failure of the power reception device 20 and the battery 320 during power transfer. The power reception device 20 controls the power transferred under the power request rate notified by the first communication device 120.

The power request is determined based on compatibility check information such as the WPT circuit topology, geometry, ground clearance, and electromagnetic compatibility (EMC) of the vehicle 3 and the primary device 13. The magnetic field varies depending on these specifications, making it necessary to transfer power within a range satisfying EMC.

The power control and the power reception device 20 in the power transmission ECU 110 can cause mutual interference. In particular, there is a possibility of interference when the supply device 5 is intended to achieve, by wide-area wireless communication, a power request exceeding the latest power limit in the power reception device 20. An example of this is sudden regenerative control with a relatively small battery 320 in the vehicle 3. If possible, it is desirable that the supply device 5 can detect incompatibility between the power supply control target and the limit and can adjust power transfer in order to eliminate the incompatibility.

For example, in a case where power transfer is interrupted for a short period while the secondary device 22 is still above the primary device 13, such as when a foreign object on the primary device 13 is detected by the foreign object detection device 140, or when magnetic coupling is weakened due to misalignment of the secondary device 22, the state transitions to Stand-by A160. When the foreign object detection device is provided in the vehicle 3, the foreign object may be detected on the vehicle 3.

When the secondary device 22 passes over the primary device 13, the state transitions to Power transfer terminated A170. In this case, since the magnetic coupling between the two devices is weakened, the transferred power is reduced. Since the supply device 5 can detect the weakened magnetic coupling by monitoring the transfer power, the supply device 5 basically determines the state transition to Power transfer terminated A170 and then starts to lower the voltage to stop the power transfer.

The Stand-by A160 will be described. In this state, power transfer is interrupted for a short period for some reason, and when both the vehicle 3 and the supply device 5 are ready for D-WPT, the state returns to Perform Power Transfer A150. When there is a possibility of interrupting power transfer, the state shifts to Stand-by A160.

Power transfer terminated A170 will be described.

In this state, the supply device 5 reduces the transferred power to zero, and holds or uploads the power transfer result data such as total transfer power, the power transfer efficiency, and failure history. Each piece of data has vehicle identification information attached as a tag. Finally, the supply device 5 deletes the vehicle identification information of the vehicle 3 that has passed through the D-WPT lane. This makes it possible for the supply device 5 to prepare for pairing and power transfer to be performed on another vehicle thereafter. A processing sequence of Power transfer terminated A170 is illustrated in FIG. 9.

Figure 9:
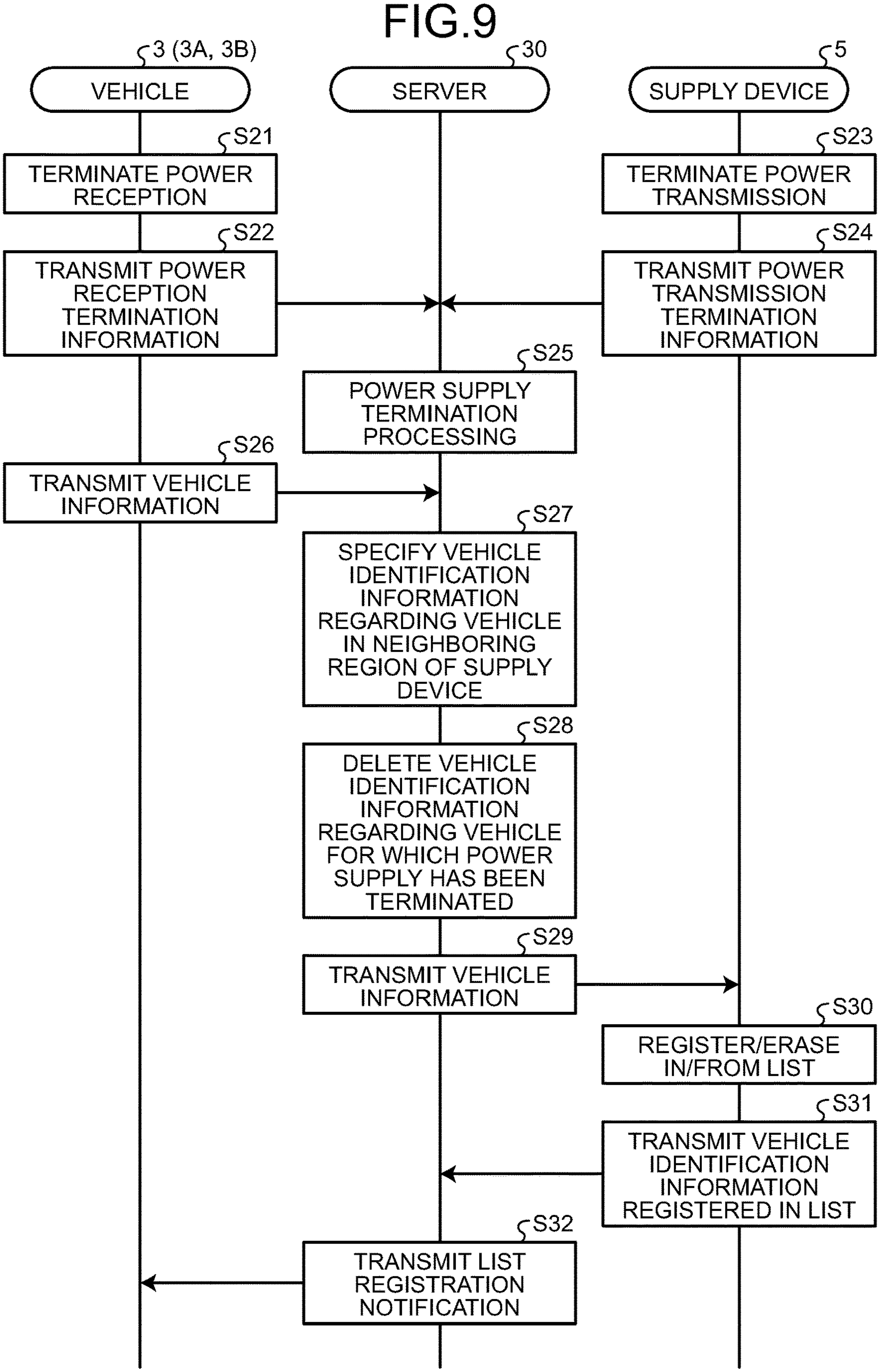
FIG. 9 is a sequence diagram illustrating an operation after completion of in-motion power supply from the supply device to the vehicle.

FIG. 9 is a sequence diagram illustrating an operation after completion of in-motion power supply from the supply device 5 to the vehicle 3.

When the power reception from the supply device 5 is terminated in the power reception device 20 of the vehicle 3 (step S21), the vehicle 3 transmits power reception termination information to the server 30 (step S22). In step S22, power reception termination information is transmitted from the third communication device 340 of the vehicle 3. As information related to power reception from the supply device 5, the power reception termination information includes vehicle identification information of the vehicle 3, received power from the supply device 5, power reception efficiency, and an abnormality detection result, for example.

When the processing of step S21 is performed, the supply device 5 terminates the power transmission to the vehicle 3 (step S23). The processing of step S21 and the processing of step S23 may be performed simultaneously or separately. When the processing of step S23 is performed, the supply device 5 transmits power transmission termination information to the server 30 (step S24). In step S24, power transmission termination information is transmitted from the first communication device 120 of the supply device 5.

When having received the power reception termination information from the vehicle 3 and received the power transmission termination information from the supply device 5, the server 30 performs power supply termination processing of terminating the power supply from the supply device 5 to the vehicle 3 (step S25). The power supply termination processing includes: processing of calculating the power supply amount from the supply device 5 to the vehicle 3; and processing of charging the user of the vehicle 3 based on the calculated power supply amount, which are performed based on the power reception termination information and the power transmission termination information.

Meanwhile, the vehicle 3 transmits the vehicle information to the server 30 regardless of the power supply termination processing (step S26). In step S26, vehicle information is transmitted from the third communication device 340 of the vehicle 3.

When having received the vehicle information from the vehicle 3 after performing the power supply termination processing, the server 30 specifies the vehicle identification information of the vehicle 3 located in the neighboring region of each supply device 5 based on the vehicle information (step S27).

When the power supply termination processing onto the certain vehicle 3 has already been performed in the certain supply device 5, the server 30 deletes the vehicle identification information of the vehicle 3 for which the power supply termination processing has already been performed from the vehicle identification information of the vehicle 3 in the neighboring region of the certain supply device 5 specified in the processing of step S27 (step S28).

Thereafter, the server 30 transmits, to each of the supply devices 5, vehicle information associated with the vehicle identification information that has not been deleted in the processing of step S28 among the vehicle identification information of the vehicle 3 identified as being located in the neighboring region of each of the supply devices 5 (step S29).

The vehicle information has been transmitted to each supply device 5 in the processing of step S29 and thereafter the supply device 5 has received the vehicle information from the server 30. Thereafter, the supply device 5 performs registration/erasure of the vehicle identification information in/from the identification information list (step S30). The processing of step S30 is similar to the processing of step S14 in FIG. 8. Thereafter, the supply device 5 transmits the vehicle identification information registered in the identification information list to the server 30 (step S31). The processing of step S31 is similar to the processing of step S15 in FIG. 8.

When having received the vehicle identification information from the supply device 5, the server 30 transmits a list registration notification to the vehicle 3 corresponding to the vehicle identification information registered in the identification information list (step S32). The processing in step S32 is similar to the processing of step S16 in FIG. 8.

As a result, that is, when the processing illustrated in FIG. 9 is performed, vehicle identification information is to be registered in the identification information list for the vehicle 3 positioned in the neighboring region of each of the supply devices 5 and for which the power supply from the supply device 5 has not been completed and the vehicle identification information erasure request has not been issued. When the vehicle identification information of the vehicle 3 is registered in the identification information list of any of the supply facilities 2, the vehicle 3 receives a list registration notification. Therefore, by receiving the list registration notification, the vehicle ECU 330 can determine that the host vehicle has been registered in one of the supply devices 5. When the vehicle 3 goes out of the neighboring region of the supply device 5, the vehicle identification information of the vehicle 3 is erased from the identification information list of the supply device 5.

Returning to FIG. 7. In addition, at Power transfer terminated A170, nothing needs to be done on the power reception device 20 in order to set the transfer power to 0. The P2PS interface is kept active when the vehicle 3 is in the D-WPT lane, and the state of the power reception device 20 automatically transitions to pairing for power transfer from the next primary device 13. As with the transition line illustrated in FIG. 7, the state transitions from Power transfer terminated A170 to Pairing/Alignment check A130. As illustrated in FIG. 7, when a predetermined transition condition is satisfied, it is possible to transition from Magnetic Coupling Check A140 to Pairing/Alignment check A130 and transition from Perform Power Transfer A150 to Pairing/Alignment check A130. The pairing may be individually performed on the plurality of primary coils 11, or may be performed on a representative point of a bundle of the plurality of primary coils 11.

When there is no D-WPT request from the vehicle ECU 330 or when a series of states from Communication setup/ Request D-WPT service A60 to Power transfer terminated A170 is prohibited, the D-WPT service session A70 transitions to Terminate D-WPT service session A80 and stops wide-area wireless communication between the first communication device 120 and the third communication device 340. For example, D-WPT stops when the charge state in the battery 320 is too high or when the power reception device 20 is too hot due to continuous power transfer. Such an unwanted D-WPT can be disabled simply by deactivating the P2PS interface. However, by stopping the wide-area wireless communication, the power transmission ECU 110 can terminate the established wide-area wireless communication, making it possible to release the memory occupied for the vehicle 3 without the need to use the D-WPT.

The D-WPT service session A70 is not limited to transitions indicated by the transition lines illustrated in FIG. 7. When Pairing/Alignment check A130 or subsequent activities are terminated in the D-WPT service session A70, and when a condition that the power transfer process stays in the D-WPT service session A70 is satisfied, the state transitions to Compatibility check/Service authentication A110 instead of making a transition to Terminate D-WPT service session A80. For example, in a case where a predetermined transition condition is satisfied in the state of Magnetic Coupling Check A140, the state can transition to Compatibility check/ Service authentication A110.

Details of Vehicle 3A in Perform Power Transfer A150

Figure 10:
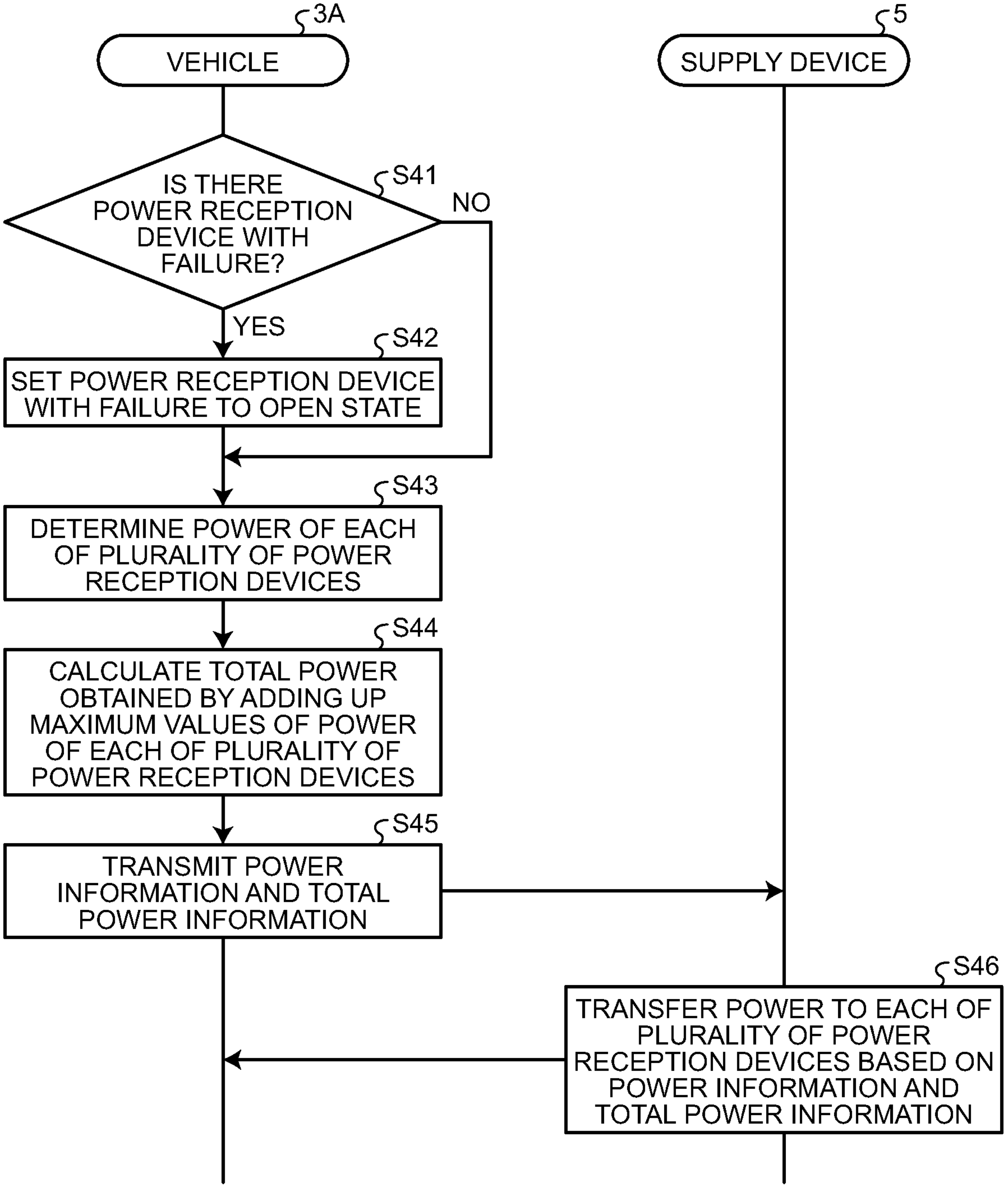
FIG. 10 is a sequence diagram illustrating an operation using P2PS between the vehicle and the supply device in Perform Power Transfer.

Next, Perform Power Transfer A150 will be described. FIG. 10 is a sequence diagram illustrating an operation using P2PS between the vehicle 3A and the supply device 5 in Perform Power Transfer A150.

As illustrated in FIG. 10, the vehicle ECU 330 determines whether there is a power reception device 20 with a failure among the power reception devices $\mathbf{20}_1$ to $\mathbf{20}_n$ (step S41). Specifically, on each of the plurality of power reception devices $\mathbf{20}_1$ to $\mathbf{20}_n$, the vehicle ECU 330 determines the power reception device 20 having a predetermined abnormality confirmation operation, for example, a current value on an ammeter (not illustrated) or a voltage value on a voltmeter (not illustrated) less than a predetermined value, as a device with a failure. Not limited to this, the vehicle ECU 330 may determine the power reception device 20 in which the received power or magnetic coupling from the supply device 5 of each of the plurality of power reception devices $\mathbf{20}_1$ to $\mathbf{20}_n$ is less than a predetermined value, as a device with a failure. When the vehicle ECU 330 determines that there is a power reception device 20 with a failure among the power reception devices $\mathbf{20}_1$ to $\mathbf{20}_n$ (step S41: Yes), the vehicle ECU 330 turns the charging relay 310 corresponding to the power reception device 20 with a failure to an open state (step S42), and proceeds to the processing of step S43. This can suppress unwanted charging of the vehicle 3A. In contrast, when the vehicle ECU 330 determines that there is no power reception device 20 with a failure among the power reception devices $\mathbf{20}_1$ to $\mathbf{20}_n$ (step S41: No), the processing proceeds to step S43.

Subsequently, the vehicle ECU 330 determines the power to be received by each of the power reception devices $\mathbf{20}_1$ to $\mathbf{20}_n$ from the supply device 5 (step S43). In this case, the vehicle ECU 330 determines the power to be received individually by the power reception devices $\mathbf{20}_1$ to $\mathbf{20}_n$ from the supply device 5 based on the coil shape of the primary coil 11 of each of the plurality of power reception devices $\mathbf{20}_1$ to $\mathbf{20}_n$, circuit specifications such as the arrangement position of the primary coil 11 in the vehicle 3A, the inter-coil gap of the primary coil 11, the vehicle speed of the vehicle 3A, and the SOC of the battery 320.

Thereafter, the vehicle ECU 330 calculates the total power obtained by adding up the maximum values of the power to be received individually by the power reception devices $\mathbf{20}_1$ to $\mathbf{20}_n$ from the supply device 5 (step S44). In this case, the vehicle ECU 330 calculates the total power of the power to be received from the supply device 5 individually by the power reception devices $\mathbf{20}_1$ to $\mathbf{20}_n$ so as not to exceed the SOC of the battery 320.

Subsequently, the vehicle ECU 330 transmits power information and total power information to the supply device 5 (step S45). Specifically, the vehicle ECU 330 causes the fourth communication devices $\mathbf{350}_1$ to $\mathbf{350}_n$ respectively corresponding to the power reception devices $\mathbf{20}_1$ to $\mathbf{20}_n$ to transmit power information related to the power to be received individually by the power reception devices $\mathbf{20}_1$ to $\mathbf{20}_n$ from the supply device 5. In this case, the vehicle ECU 330 causes the fourth communication devices $\mathbf{350}_1$ to $\mathbf{350}_n$, corresponding to each of the power reception devices $\mathbf{20}_1$ to $\mathbf{20}_n$ respectively, to transmit power information by a modulated signal. Furthermore, the vehicle ECU 330 causes the third communication device 340 to transmit the maximum values of the power to be received individually by the power reception devices $\mathbf{20}_1$ to $\mathbf{20}_n$ from the supply device 5 as well as the total power information, which is information related to the total power obtained by adding up the maximum values of the power received individually by the power reception devices $\mathbf{20}_1$ to $\mathbf{20}_n$ from the supply device 5. The reason for transmitting the total power information is that the capacity of the battery 320 varies depending on the vehicle type of the vehicle 3, and the driving power demand fluctuates rapidly. Examples of this sudden fluctuation include sudden regenerative braking. When the regenerative braking is performed while the vehicle is in motion in the D-WPT lane, the regenerative braking is prioritized, and thus, the received power from the power reception device 20 is supplied to the battery 320 in addition to the regenerative power. In this case, it is necessary to adjust the transfer power by the power reception device 20 in order to protect the battery 320 from overcharge. Therefore, the vehicle ECU 330 transmits, to the supply device 5, the total power obtained by adding up the maximum values of the power received individually by the power reception devices $\mathbf{20}_1$ to $\mathbf{20}_n$ from the supply device 5. Note that the vehicle ECU 330 may transmit the power information and the total power information to the server 30. In this case, the server 30 transmits the power information and the total power information received from the vehicle 3A to the supply device 5.

Thereafter, the supply device 5 transfers power to the vehicle 3A based on the power information and the total power information transmitted from the vehicle 3A (step S46). Specifically, the power transmission ECU 110 of the supply device 5 causes the segment 7 to transfer power using contactless power transfer based on the power receivable by each of the power reception devices $\mathbf{20}_1$ to $\mathbf{20}_n$ included in the power information. In this case, the power transmission ECU 110 causes the segment 7 to transfer the power receivable by each of the power reception devices $\mathbf{20}_1$ to $\mathbf{20}_n$ so as not to exceed the total power obtained by adding up the maximum values of the power to be received individually by the power reception devices $\mathbf{20}_1$ to $\mathbf{20}_n$ from the supply device 5. This makes it possible to protect the battery 320 from overcharge even when regenerative power occurs in the vehicle 3A. After completion of Perform Power Transfer A150, the state transitions to Power transfer terminated A170.

Details of Vehicle 3B in Perform Power Transfer A150

Figure 11:
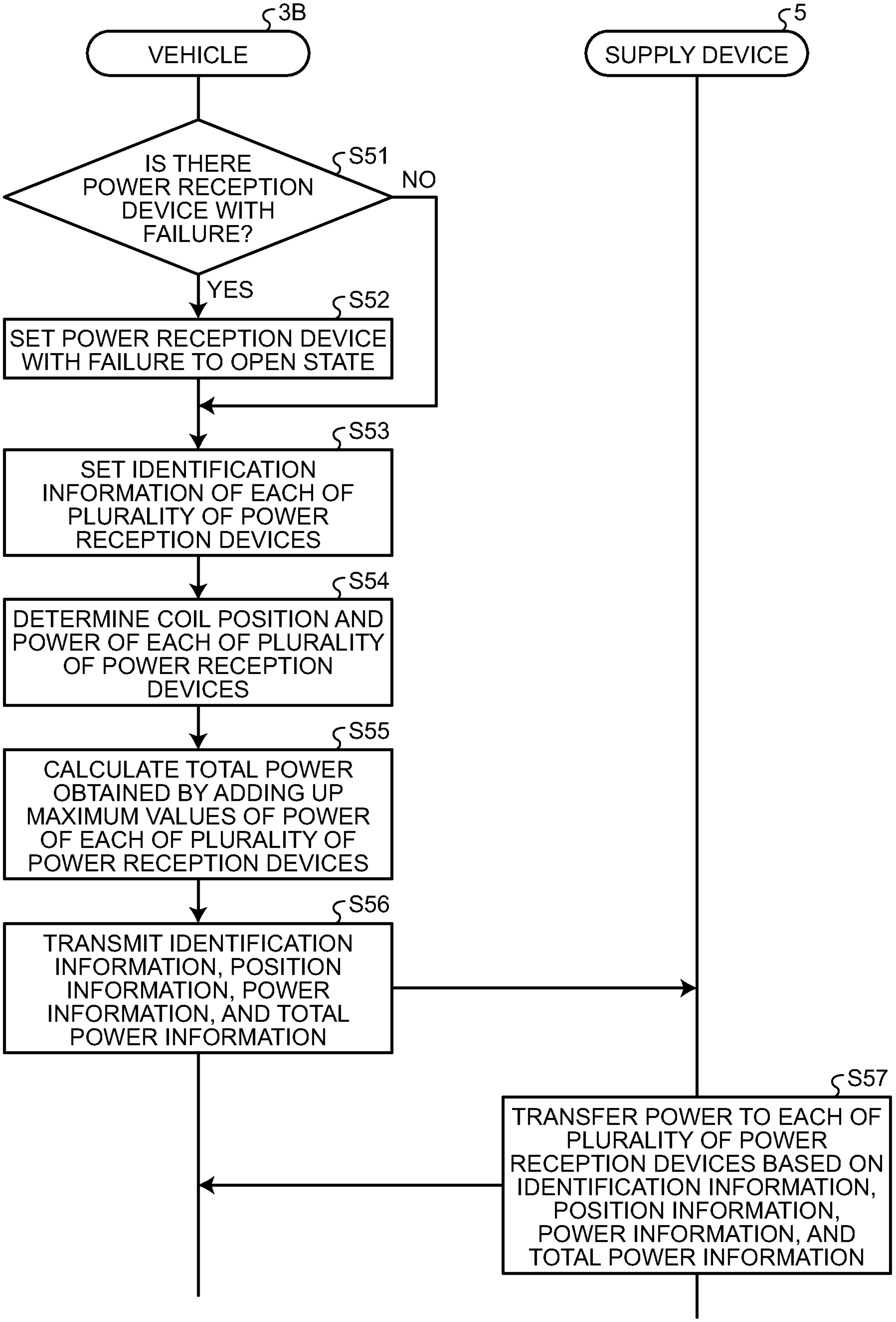
FIG. 11 is a sequence diagram illustrating an operation using P2PS between the vehicle and the supply device in Perform Power Transfer.

Next, Perform Power Transfer A150 will be described. FIG. 11 is a sequence diagram illustrating an operation using the P2PS between the vehicle 3B and the supply device 5 in Perform Power Transfer A150. Steps S51 and S52 in FIG. 11 correspond to steps S41 and S42 in FIG. 10, respectively, and thus a detailed description thereof is omitted.

In step S53, the vehicle ECU 330 sets identification information (coil ID) of each of the power reception devices $\mathbf{20}_1$ to $\mathbf{20}_n$.

Subsequently, the vehicle ECU 330 determines the coil position and the power of each of the power reception devices $\mathbf{20}_1$ to $\mathbf{20}_n$ (step S54).

Thereafter, the vehicle ECU 330 calculates the total power obtained by adding up the maximum values of the power to be received individually by the power reception devices $\mathbf{20}_1$ to $\mathbf{20}_n$ from the supply device 5 (step S55).

Subsequently, the vehicle ECU 330 transmits the power information and the total power information to the supply device 5 (step S56). Specifically, the vehicle ECU 330 causes the third communication device 340 to transmit the maximum values of the power to be received individually by the power reception devices $\mathbf{20}_1$ to $\mathbf{20}_n$ from the supply device 5 as well as the total power information, which is information related to the total power obtained by adding up the maximum values of the power received individually by the power reception devices $\mathbf{20}_1$ to $\mathbf{20}_n$ from the supply device 5. Furthermore, the vehicle ECU 330 causes the fourth communication device 350 to transmit the identification information corresponding to each of the power reception devices $\mathbf{20}_1$ to $\mathbf{20}_n$, the position information related to the position of each of the power reception devices $\mathbf{20}_1$ to $\mathbf{20}_n$ in the vehicle 3B, and the power information related to the power to be received individually by the power reception devices $\mathbf{20}_1$ to $\mathbf{20}_n$ from the supply device 5. In this case, the vehicle ECU 330 causes the fourth communication device 350 to transmit the identification information, the position information, and the power information by the modulated signal.

Thereafter, the supply device 5 transfers power to the vehicle 3B based on the identification information, the position information, the power information, and the total power information transmitted from the vehicle 3B (step S57). Specifically, the power transmission ECU 110 of the supply device 5 controls to transfer, using contactless power transfer, the power receivable by each of the power reception devices $\mathbf{20}_1$ to $\mathbf{20}_n$ based on the identification information, the position information, and the power information corresponding to each of the power reception devices $\mathbf{20}_1$ to $\mathbf{20}_n$. In this case, the power transmission ECU 110 causes the segment 7 to transfer the power receivable by each of the power reception devices $\mathbf{20}_1$ to $\mathbf{20}_n$ so as not to exceed the total power obtained by adding up the maximum values of the power to be received individually by the power reception devices $\mathbf{20}_1$ to $\mathbf{20}_n$ from the supply device 5. With this configuration, even when regenerative power occurs in the vehicle 3B, the battery 320 can be protected from overcharge, and even when the power reception devices $\mathbf{20}_1$ to $\mathbf{20}_n$ are provided in the vehicle 3B, power suitable for each of the power reception devices $\mathbf{20}_1$ to $\mathbf{20}_n$ can be transferred only by one fourth communication device 350. After completion of Perform Power Transfer A150, the state transitions to Power transfer terminated A170.

According to the embodiment described above, the vehicle ECU 330 determines the power to be received by each of the power reception devices $\mathbf{20}_1$ to $\mathbf{20}_n$ from the supply device 5, and transmits the power information related to the determined power to the supply device 5, making it possible to perform charging even when the power reception devices $\mathbf{20}_1$ to $\mathbf{20}_n$ are provided on the vehicle 3 side.

In addition, according to the embodiment, the vehicle ECU 330 causes the fourth communication devices $\mathbf{350}_1$ to $\mathbf{350}_n$ respectively corresponding to the power reception devices $\mathbf{20}_1$ to $\mathbf{20}_n$ to transmit power information related to the power to be received individually by the power reception devices $\mathbf{20}_1$ to $\mathbf{20}_n$ from the supply device 5. This makes it possible to independently control the power reception on the power reception devices $\mathbf{20}_1$ to $\mathbf{20}_n$.

Furthermore, according to the embodiment, the vehicle ECU 330 causes the third communication device 340 to transmit the maximum values of the power received individually by the power reception devices $\mathbf{20}_1$ to $\mathbf{20}_n$ from the supply device 5 as well as the total power information, which is information related to the total power obtained by adding up the maximum values of the power to be received individually by the power reception devices $\mathbf{20}_1$ to $\mathbf{20}_n$ from the supply device 5. This makes it possible to protect the battery 320 from overcharge even when regenerative power occurs in the vehicle 3A.

Furthermore, according to the embodiment, the vehicle ECU 330 causes the fourth communication device 350 to transmit the identification information corresponding to each of the power reception devices $\mathbf{20}_1$ to $\mathbf{20}_n$, the position information of each of the power reception devices $\mathbf{20}_1$ to $\mathbf{20}_n$, and the power information related to the power to be received individually by the power reception devices $\mathbf{20}_1$ to $\mathbf{20}_n$ from the supply device 5. This makes it possible to transfer the power suitable for each of the power reception devices $\mathbf{20}_1$ to $\mathbf{20}_n$ by using only one fourth communication device 350.

Furthermore, according to the embodiment, when there is a power reception device 20 with a failure among the plurality of power reception devices $\mathbf{20}_1$ to $\mathbf{20}_n$, the vehicle ECU 330 opens (turns it to the open state) the charging relay 310 corresponding to the power reception device 20 with a failure. This can suppress unwanted charging of the vehicle 3A.

In addition, in the wireless power transfer system according to the embodiment, the above-described "device" can be replaced with other terms such as "means" and "circuit". For example, the power reception device can be replaced with a power reception means or a power reception circuit.

Furthermore, the programs to be executed by the wireless power transfer system according to the embodiment are provided as file data of an installable format or an executable format in a state of being stored in a computer-readable recording medium such as a CD-ROM, flexible disk (FD), CD-R, Digital Versatile Disk (DVD), USB medium, flash drive, or the like.

In the description of the flowcharts in the present specification, although the expressions "first", "next", "subsequently", or the like are used to clarify a processing order of the steps, the processing order needed to carry out the present embodiments shall not be defined uniquely by these expressions. That is, the processing order in each of the flowcharts described in the present specification can be changed unless it is inconsistent.

According to the present disclosure, there is an effect that charging can be performed even with a plurality of power reception devices provided on the vehicle.

It should be noted that further effects and modified example would be easily derived by a person skilled in the art. Configuration having a greater range than the present disclosure are not limited to the specific details and typical embodiments indicated and described above. Therefore, various modification would be obtained without departing from the spirit and the range of the concepts of the overall disclosures defined by the attached claims and equivalents.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless power transfer system that transfers power from a supply device on a road to a vehicle using contactless power transfer, wherein the wherein the supply device includes:

a first communication device that performs wide-area wireless communication; and a second communication device that performs short-range wireless communication, wherein the vehicle includes:

a plurality of power reception devices that receive power from the supply device;

a third communication device that performs wide-area wireless communication;

a plurality of fourth communication devices that performs short-range wireless communication and that correspond to the plurality of power reception devices; and a processor, and the processor:

sets, in response to a failure of one of the plurality of power reception devices, a charging relay electrically connected to the one of the plurality of power reception devices with the failure to an open state;

determines power to be received by each of the plurality of power reception devices;

calculates a total power obtained by adding maximum values of the power to be received by each of the plurality of power reception devices;

causes the third communication device to transmit maximum values of the power to be received of each of the plurality of power reception devices and total power information related to the total power; and causes each of the plurality of fourth communication devices corresponding to each of the plurality of power reception devices to transmit power information of each of the plurality of power reception devices.

2. The wireless power transfer system according to claim 1, wherein the supply device transfers power to each of the plurality of power reception devices based on the total power information received via the first communication device and the power information of each of the plurality of power reception devices received via the second communication device.

3. The wireless power transfer system according to claim 1, wherein the processor:

sets identification information of identifying each of the plurality of power reception devices;

determines power to be received by each of the plurality of power reception devices; and transmits position information of each of the plurality of power reception devices, the identification information, and power information related to the power of each of the plurality of power reception devices.

4. The wireless power transfer system according to claim 1, wherein the vehicle includes:

a battery; and charging relays that are provided in respective power reception devices and electrically connect the power reception devices and the battery to each other.

* * * * *